United States Patent [19]

Phinney

[11] Patent Number: 5,025,500
[45] Date of Patent: * Jun. 18, 1991

[54] APPARATUS FOR PROVIDING MULTIPLE CONTROLLER INTERFACES TO A STANDARD DIGITAL MODEM AND INCLUDING INTEGRAL CONFLICT RESOLUTION

[75] Inventor: Thomas L. Phinney, Boulder City, Nev.

[73] Assignee: Honeywell Inc., Minneapolis, Minn.

[*] Notice: The portion of the term of this patent subsequent to Feb. 12, 2008 has been disclaimed.

[21] Appl. No.: 363,843

[22] Filed: Jun. 9, 1989

[51] Int. Cl.$^5$ .................. H04J 03/04; H04B 01/38
[52] U.S. Cl. .................. 370/85.13; 455/88; 340/825.5
[58] Field of Search ........ 370/85.1, 85.2, 85.12–85.14, 370/88.11; 340/825.5, 825.06; 375/36, 38; 455/4, 88

[56] References Cited

U.S. PATENT DOCUMENTS 4,608,700  8/1986  Kirtley, Jr. et al. ......... 370/85.11 X Primary Examiner—Benedict V. Safourek
Assistant Examiner—Tesfaldet Bocure
Attorney, Agent, or Firm—A. A. Sapelli; D. J. Lenkszus; A. Medved

[57] ABSTRACT

A communication system which includes a modem and a plurality of controllers has each controller connected to the modem by an interface apparatus, each controller and the modem complying with a predetermined protocol. The interface apparatus comprises a bus which provides a medium to transfer signals between the controllers and the modem. A first interface unit, which interfaces the modem to the bus, implements a modem-associated multi-state state machine and responds to signals on the bus maintaining the predetermined protocol between the modem and the first interface unit. A plurality of second interface units interface a corresponding controller to the bus. Each second interface unit implements a controller-associated multi-state state machine which responds to signals on the bus and further responds to signals from the corresponding controller, each second interface unit maintaining the predetermined protocol between the second interface unit and the corresponding controller. Further, each second interface unit transmits onto the bus in a predefined cycle to resolve conflicts between controllers for access to the bus.

29 Claims, 5 Drawing Sheets

APPARATUS FOR PROVIDING MULTIPLE CONTROLLER INTERFACES TO A STANDARD DIGITAL MODEM AND INCLUDING INTEGRAL CONFLICT RESOLUTION

RELATED PATENT APPLICATION

The present patent application is related to U.S. patent application, Ser. No. 07/363,844, now U.S. Pat. No. 4,989,203, entitled "APPARATUS FOR PROVIDING MULTIPLE CONTROLLER INTERFACES TO A STANDARD DIGITAL MODEM AND INCLUDING SEPARATE CONTENTION RESOLUTION," by T. Phinney, and to U.S. patent application, Serial No. 07/363,842, entitled "APPARATUS FOR PROVIDING MULTIPLE CONTROLLER INTERFACES TO A STANDARD DIGITAL MODEM AND INCLUDING MULTIPLEXED CONTENTION RESOLUTION," by T. Phinney, both applications filed on even date herewith, and assigned to Honeywell Inc., the assignee of the present invention.

BACKGROUND OF THE INVENTION

This invention relates to a digital interface apparatus, and more particularly, to an apparatus for providing multiple controller interfaces to a standard digital modem, and includes an integral method of resolving conflicting outputs from the connected controllers.

In present communication systems utilizing a bus approach, which in particular conforms to IEEE standard 802.4-1989 section 10 (which is now also ISO DIS 8802/4 section 10-(1988)), each controller interfaces with a modem. In particular, controllers of the aforementioned communication systems could not share modems. Each controller interfaced with its corresponding modem.

Therefore, because of the relatively high cost of the modem, there is a need to reduce the number of modems employed in a communication system using the IEEE 802.4 standard. There is provided by the present invention an apparatus which permits multiple (token bus) controllers of the aforementioned communication systems to share a single modem. Further since the modem itself has an analog connection to a medium, there is created certain loads on the medium in terms of energy loading on the bus so that for a given system there is a limited number of ports for connecting the analog modem. By being able to share one analog modem across many digital controllers, there is effectively a multiplier placed in the system of how many devices can be connected. Without having to put repeaters in the analog line, a system is thereby created in which each analog port interfaces many digital controllers by sharing the modem.

A further feature of the present invention reduces the need to have fiber optic or coax cables to connect each device on the bus to every other device on the bus. In the present invention, because these signals are in the form of digital signals, printed wiring backplane or conventional multi-conductor ribbon cable and their associated connectors can be used for devices or modules within close proximity rather than having to utilize specialized fiber optic or coax connectors, and fiber optic or coax cables, respectively. Furthermore, the modem serves to isolate the devices or modules so that they can communicate with each other despite the presence of disabling faults elsewhere in the communications system. Also, for equipment within close proximity, the modems can be eliminated entirely (with a very minor modification), thereby reducing the cost, and still permitting the equipment to have the same interface as if the equipment were communicating remotely.

SUMMARY OF THE INVENTION

Therefore, in a communication system utilizing the IEEE 802.4 standard, there is provided by the present invention, an apparatus for providing an interface between multiple controllers and a single modem. The communication system which utilizes the present invention has a modem which provides a link to remote modems, each modem being connected by a common medium. The communication system further has a plurality of controllers, each controller connected to the modem via an interface apparatus. The modem and the controllers comply with a predetermined protocol. The interface apparatus of the present invention comprises a bus which provides a local medium to transfer signals between the controllers and the modem. A first interface unit, which interfaces the modem to the bus, implements a modem-associated multi-state state machine and responds to signals on the bus maintaining the predetermined protocol between the modem and the first interface unit. A plurality of second interface units interface a corresponding controller to the bus. Each second interface unit implements a controller-associated multi-state state machine which responds to signals on the bus and further responds to signals from the corresponding controller, each second interface unit maintaining the predetermined protocol between the second interface unit and the corresponding controller. Further, each second interface unit transmits onto the bus in a predefined cycle to resolve conflicts between controllers for access to the bus.

Accordingly, it is an object of the present invention to provide an apparatus which permits multiple controllers to share a single modem.

It is another object of the present invention to provide an apparatus which permits an increase in the number of devices that can be put on a given system without affecting the analog loading of a medium, and therefore the medium structure.

These and other objects of the present invention will become more apparent when taken in conjunction with the following description and attached drawings, wherein like characters indicate like parts, and which drawings form a part of the present application.

DETAILED DESCRIPTION

Figure 1:
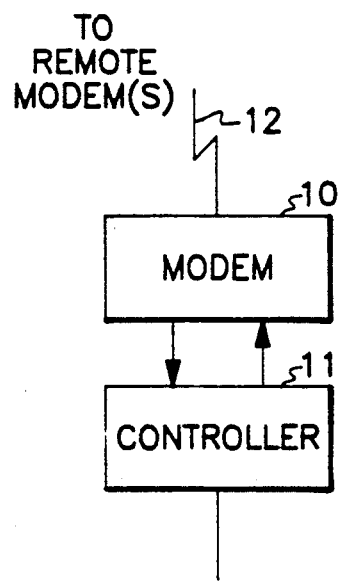
FIG. 1 shows a block diagram of a partial communication system of the prior art.

Referring to FIG. 1, there is shown a block diagram of a prior art, partial 802.4 communication system that has a single modem 10 and a single controller 11, one to one, and that there are signals that go from the controller 11 to the modem 10, and separate signals that go from the modem 10 to the controller 11.

Figure 2:
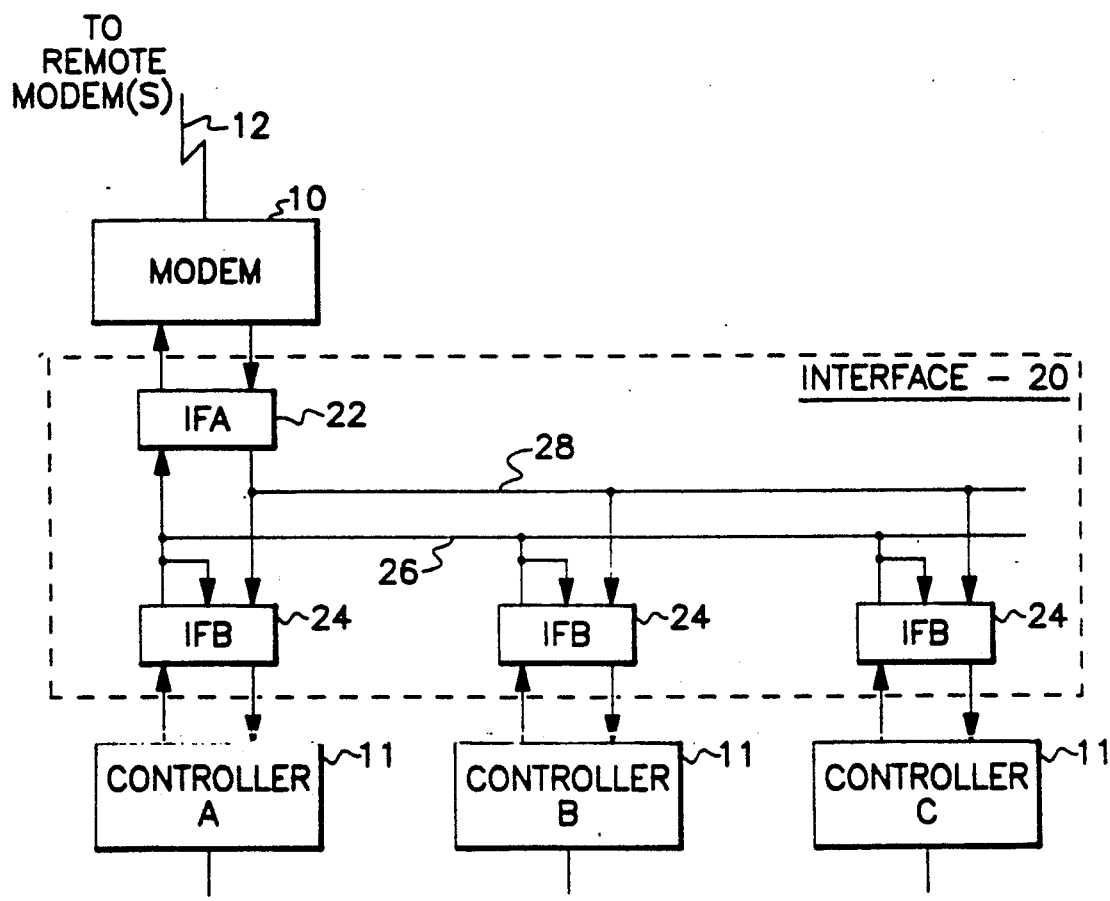
FIG. 2 shows a block diagram of a partial communications system including the apparatus of the present invention permitting multiple controllers to share a single modem.

Referring to FIG. 2, there is shown a block diagram of a partial communication system, including a single modem 10, a plurality of controllers 11, CONTROLLER A, CONTROLLER B, CONTROLLER C, .... Modem 10 is a standard 802.4 compatible modem connected to a medium 12, and controllers 11 are 802.4 compatible token bus controllers 11 being standard components available in the marketplace.

An apparatus, interface 20, of the present invention includes interface A (IFA) 22 and interface B (IFB) 24, which provides the interface for two (multi-wire wide) buses 26, 28, the first bus 26 being sourced by any or all of the controllers 11, and the other (second bus 28) being sourced by the modem 10. Therefore, there are two networks 26, 28 which replace the two sets of point-to-point lines of the prior art modem-controller pairing of the 802.4 system of FIG. 1. Network 28 is unidirectional; network 26 is unidirectional with respect to interface A 22 but is bidirectional with respect to interface B 24. Instead of one-to-one modem controller pairing, there is provided by the apparatus of the present invention, an N-to-1 (and N-to-N) network 26, and a 1-to-N network 28, having N-controllers and one modem.

The logic of IFB 24 goes on the controller side of the networks (i.e., pair of networks) 26, 28, and the logic of IFA 22 goes on the modem side of this pair of networks 26, 28, such that the controller 11 will only see valid signals (i.e., signals that are valid according to the 802.4 standard), and such that the modem 10 will only see signals that are valid according to the 802.4 standard. Any controller 11 and any modem 10 that meets this standard (i.e., the 802.4 standard, and in particular the interface specification of section 10 (1989)) will operate correctly in the "sharing" configuration of the system of FIG. 2 with the interface 20.

The IEEE Standard 802.4 contains constraints on the interface between the controller 11 and the modem 10. Some of these constraints are electrical constraints, which include setup and hold times, voltage levels, .... Other constraints are logical or functional such as a set of legitimate symbol signaling sequences.

Figure 3:
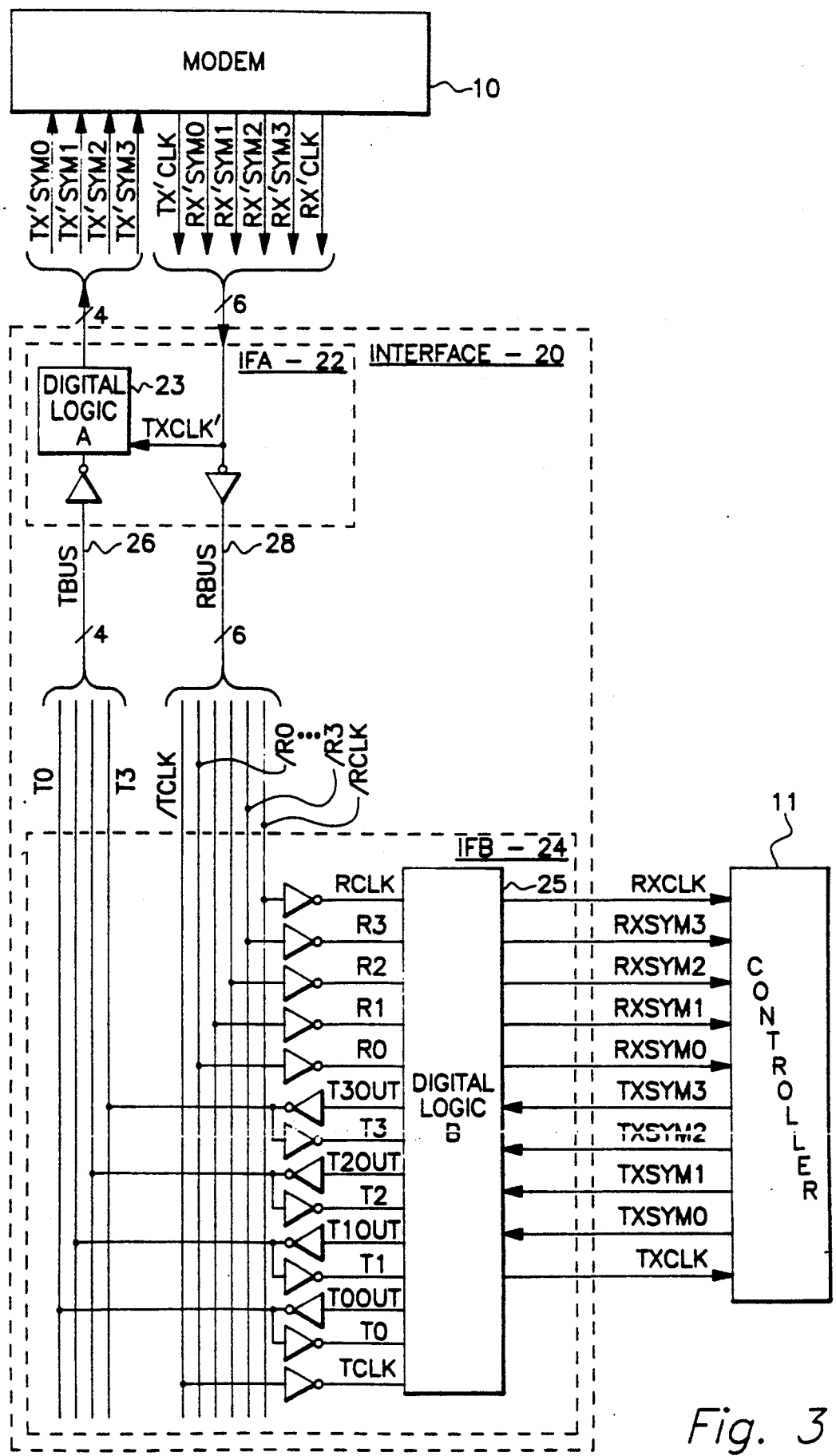
FIG. 3 shows a functional diagram of the networks coupled to the apparatus of the preferred embodiment of the present invention.
Figure 4:
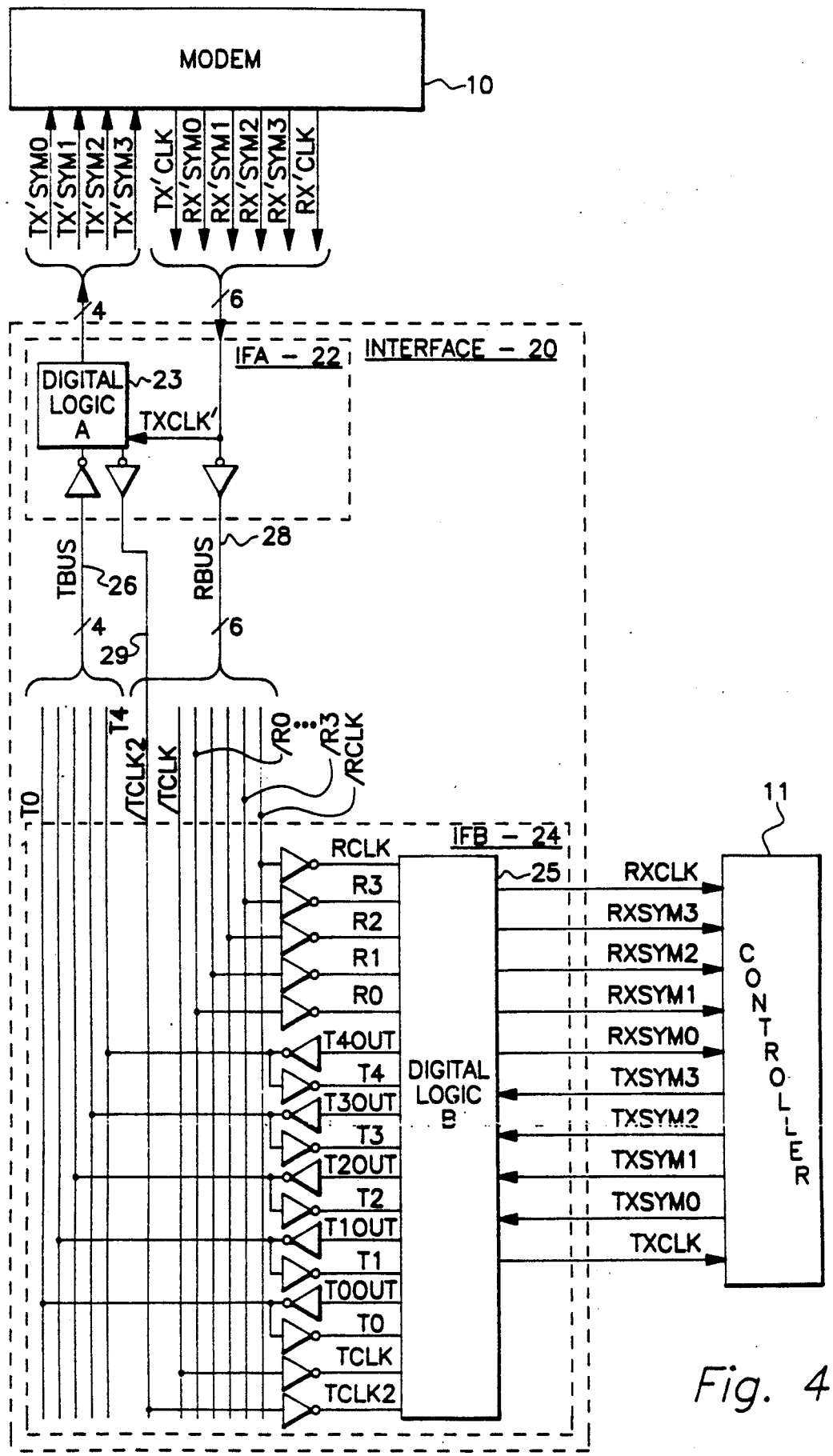
FIG. 4 shows a functional diagram of the networks coupled to an alternative embodiment of the apparatus of the present invention.

Referring to FIGS. 3 and 4, there is shown functional diagrams of the networks and the coupling with interface 20. The interface has essentially a transmit side and a receive side, each of which has parallel data lines that provides a multi-bit wide symbol. There are four data lines plus either two (FIG. 3) or three (FIG. 4) clock lines from the modem 10, carrying one of sixteen symbols on the interface; and there are either four (FIG. 3) or five (FIG. 4) data lines going to the modem 10, and thus going to and from interface IFA 22, from and to the networks 26, 28, respectively. Referring to FIGS. 3 and 4, the symbols shown in FIGS. 3 and 4 between IFB 24 and the controller 11 are the symbols used in the standard. The symbols shown in FIGS. 3 and 4 coupled to interface IFB 24 from the networks 26, 28 are related names/symbols because the signals on the networks 26, 28 (sometimes referred to herein as bus 26, 28) are different than those of the standard. (The signals on the bus 26, 28 are modified by the logic IFA 22 and IFB 24 such that the modem 10 and the controller 11 only see the standard signals and signaling sequences). Also shown is digital logic A 23 of IFA 22 and digital logic B 25 of IFB 24, which will be described in further detail hereinunder. Also shown in FIG. 4 is an additional clock line 29 which is essentially the modem-supplied Tx'Clk divided by two (i.e., one-half the frequency or the modem supplied Tx'Clk).

The symbols referred to above are defined in table 1, which are basically derived from the 802.4 standard symbols, standing for silence, data, bad signal, preamble, .... For example, for a preamble symbol the state of the transmit lines is, TXSYM3 is a (logic) one, TXSYM2 is a zero, TXSYM1 is a logic one, and TXSYM0 is a "don't care" (x=don't care). This symbol is defined in the 802.4 standard (pad—idle) and having the letter code P.

TABLE 1

| Symbol | Signal | Transmit (T) or Receive (R) | SYM Bit State | | | |
|---|---|---|---|---|---|---|
| | | | 3 | 2 | 1 | 0 |
| S | silence | T/R | 1 | 1 | 1 | X |
| D | data (0) | T/R | 1 | 0 | 0 | 0 |
| D | data (1) | T/R | 1 | 0 | 0 | 1 |
| B | bad—signal | R only | 1 | 0 | 1 | X |
| P | preamble | T only | 1 | 0 | 1 | X |
| N | non—data | T/R | 1 | 1 | 0 | X |
| M | modem control | T/R | 0 | X | X | X |

Regular expression (1) describes the constraints which the IEEE standard places on transmissions from the controller 11 to (and through) the modem 10 to the medium 12. The sequence requirements are the sequences on the 4-bit parallel TXSYM lines (bits 3-0) between IFA 22 and modem 10, and between controller 11 and IFB 24. When the controller 11 communicates directly to the modem (for modem control), only modem-control signals are transmitted following the constraints described by expression (2).

$$S^{\geq 1}[(P^8)^{\geq 1}[(NND)^2D^2](D^8)^{\geq 0}[(NND)^2D^2]^{1-2}]^{\geq 1}P^{\geq 0}S \tag{1}$$

$$S^{\geq 1}[M^{\varrho}]^{\geq 1}S \tag{2}$$

Essentially, expression (1) indicates that the transmissions from the controller 11 to the modem 10 have one or more S symbols followed by the expression in the brackets one or more times, followed by zero or more P symbols, followed by an S symbol. The expression in the brackets, referred to in the IEEE standard as a "frame", consists first of bytes of preamble (a bit of preamble is a P so a byte of preamble is 8 Ps, thus multiples of 8 P symbols. The bracket $$[(NND)^2D^2]$$

includes non-data, non-data, data, non-data, non-data, data, data, data, and is referred to as a frame delimiter. Then data bytes follow (i.e., multiple of 8 data symbols), and to end or abort the frame, another one or two frame delimiters, respectively.

The interface A, IFA, 22 including digital logic A 23, and interface B, IFB, 24 including digital logic B 25, insure that the sequence requirement, if met by the individual controllers 11, will be met by the interface 20, which allows multiple controllers to share a modem. A preamble, frame delimiter (or more simply delimiter), data, and delimiter is a frame. A transmission consists of one or more frames back to back, optionally terminated by some amount of preamble (employed here as a postamble). The controllers can be sending data in normal transmission sequences, can be silent expecting to hear data, or can be sending modem control signals. When a controller is in a modem control mode sending modem control signals, the controller expects to receive modem control response signals. When the modem detects an internal fault, the modem transmits a response signal indicating a fault condition. The fault response signal goes to all of the attached controllers, whereas modem control response signals only go to the controller in the modem control mode which is stimulating the modem control response signals, because there are two different functions overlaid on the bus, one being normal communications and the other being modem control. The interface 20 meets the requirements of the bus protocol and modem-controller interface protocol of the standard.

Figure 5:
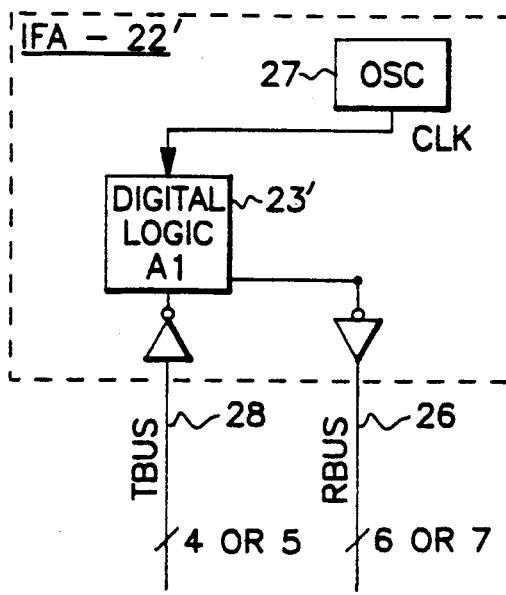
FIG. 5 shows a block diagram of a part of the interface apparatus which eliminates the modem.

Referring to FIG. 5 there is shown a block diagram of the interface A, IFA, 22' which eliminates the modem 10 (i.e., modem eliminator), and thereby substitutes for the modem. The IFA 22' includes digital logic A1 23', which will be discussed further hereinunder, and an oscillator (OSC) 27. Thus, the controllers 11, CONTA, CONTB, CONTC, . . . can still communicate with one another even though a modem is not present. Similarly, when a modem is present, but the communications system external to the modem and equipment interconnected by an embodiment of the present invention is malfunctioning, that modem can be commanded to operate in a loopback mode identical to that of the previously described "modem eliminator" 22'.

The digital logic A 23, and the digital logic A1 23', in the preferred embodiment of the present invention, are implemented using programmable logic devices (PLDs). The digital logic B 25, in the preferred embodiment of the present invention is implemented using PDLs. The digital logic A 23, digital logic A1 23' and digital logic B 25, denoted as Modem Interface Equations, Modem Eliminator Equations, and TBC Interface Equations, respectively, is given in two forms. (TBC denotes token bus controller 11.) The first form, Appendix A, is in Parallel Boolean Logic form. (Reference the Interface Definitions, Appendix B, and the IFB encoding rules, Appendix C.) The second form is in Boolean logic equations which translates directly to the combinatorial logic, Appendix D. For the modem interface $R_i$ is $Rx'Sym_i$ (where $0 \leq i \leq 3$), Rx'Sym being the names from the standard, primed (') to reflect the modem's signals.

In the present invention, there is no explicit arbitration cycle preceding the gating of a transmission from a controller (TBC) 11 to the shared modem 10. The present invention use the properties of the protocol and recodes the symbols that are transmitted for sending data or modem information such that the symbols form sets in which each set is linearly ordered in terms of lines that are asserted. Thus, if two or more IFBs 24 concurrently impress different symbols, then exactly one of those symbols will be received by the IFA 22 and all the IFBs 24 of the interface 20. The recoding orders the transmissible symbols into sets with a strict dominance relationship, such that any combination of concurrently-impressible symbols is exactly equal to one of the impressed symbols.

By such a partitioning and structuring, the system does not have to perform contention resolution (it does not have to establish an "owner" for the modem). Rather, every controller trying to send its message drives the bus (in particular, the T-Bus 26) only so long as the controller remains dominant (i.e., its message has priority over another message). If two controllers try to send different messages, one of those messages will be dominant, the controller sending a T-bus symbol with more "one" bits will win and the other controller sending a T-bus symbol with fewer "one" bits will drop out. (In the preferred embodiment, a "one" bit is dominant over a "zero" bit on each line of T-bus 26.) The controller will continue trying to source symbols to its corresponding IFB, but the IFB will stop driving the bus. It will continue to assert the undriven state on the bus (the least dominant symbol being all zeros) until the bus comes back to the idle (all zeros) state. The T-bus 26 of the preferred embodiment of the present invention is a wired—OR bus, although the bus can be any type of an unidirectional drive bus, including a wired—AND bus, with appropriate inversion of the bus symbols.

The operation of the IFB occurs in a cycle having two phases, assert and compare. The IFB asserts a symbol on the bus in the first phase and in the second phase compares what it asserted to what is on the T-bus 26. If the result of the compare indicates the signals on the bus are different from what was asserted, the IFB goes into a blocking mode (non-transmitting) and attempts to assert the idle pattern. The IFB continues this mode until the T-bus 26 is all zeros (idle), in which case a compare results; then the IFB can continue sending its information received from the controller. If all the controllers send the same message, they all have "ownership" of the bus. In the present invention it is messages which have priority over other messages when presented simultaneously.

There must be time within each transmission period on a bus for the IFB to complete the cycle, i.e., assert and compare. If the bus is too long for the chosen data rate, so that the round trip propagation delay exceeds the time between bits, the system can be modified to compensate for the delay. When the modem's data rate is low enough, or the maximum separation of the IFA and IFBs, one from another, is small enough that this recoding and dominance-assessment process can cycle at the data rate, and the T bus conveys one symbol per cycle. At higher data rates, or larger IFA and IFB separations, the cycle must occur at a lower frequency, such as a cycle rate of half the data rate. In such a case, the T bus must convey two or more symbols per cycle, necessitating a wider T bus (more parallel lines) and a more complex set of recoding rules. Below there is discussed the explicit coding rules and state machines for the one-symbol-per-cycle and the two-symbols-per-cycle modes of operation.

The TBC's symbols are classified and recoded by the IFB before their attempted transmission of the T bus (reference Table 2). During this process an additional mode shift symbol (M) can be inserted in the encoded symbol stream; either one of the TBC's "parallel"

modem-control symbols or one of its "silence" symbols will be deleted (not recoded) to preserve a 1-1 correspondence between input and output symbols.

TABLE 2

1 Bit-Per-Tbus-Cycle TxSym Encoding

| Abbreviation | 802.4-based symbol | TxSym encoding | symbol class | T-bus encoding |
|---|---|---|---|---|
| S | Silence | 111x | I | 0000 |
| P | Preamble or Pad_idle | 101x | D | 1011 |
| N | Non_data | 110x | D | 1111 |
| 0 | Zero | 1000 | D | 1000 |
| 1 | One | 1001 | D | 1001 |
| R | Reset | 0111 | MP | 1011 |
| L | disable Loopback | 0101 | MP | 1001 |
| E | Enable transmitter | 0011 | MP | 1000 |
| m0 | Serial SM zero | 0000 | MS | 1000 |
| m1 | Serial SM one | 0001 | MS | 1001 |
| M | modem control marker | none | none | 1111 | symbols are shown in Table 3.

TABLE 3

1 Bit-Per-TBus-Cycle Dominance Sets

| set | class |
|---|---|
| {S < P < M} | I |
| {S < 0 < 1 < P < N} | D |
| {S < E < L < R < M} | MP |
| {S < m0 < m1 < M} | MS |

The symbol S, for which the T bus is undriven, is the least element of all sets and represents all of the IFBs which are no longer actively driving the T bus. Tables 4 and 5 also reflect this partitioning into dominance sets. The dominant symbol of those concurrently impressed on the T bus is received by the IFA and all IFBs. The IFBs compare it to the symbol which they are impressing to determine whether or not they were dominant during the preceding T-bus cycle. The IFA tracks the encoding state of the dominant IFB(s) via a four-state finite state machine, and decodes the dominant symbol for presentation to the attached modem based on the current state of the 4-state machine. The IFA's states are:

A-idle—The T bus is idle; Silence is reported to the modem.

A-line—The T bus is being used to send MAC (Medium Access Control) symbols through the modem to the connected medium.

A-par-mgmt—The T bus is being used to send parallel modem-management symbols to the modem.

A ser-mgmt—The T bus is being used to send serial modem-management symbols to the modem.

TABLE 4

1 Bit-Per-TBus-Cycle IFA State Machine

| state name | state id | T-bus symbol classes | coding | next state |
|---|---|---|---|---|
| A-idle | 00 | I | reset | 00 |
| | | | 00xx | 00 |
| | | | x1xx | 10 |
| | | | 10xx | 01 |
| A-line | 01 | D | 00xx | 00 |
| | | | all else | 01 |
| A-par-mgmt | 10 | MP | 00xx | 00 |
| | | | x111 | 11 |
| | | | all else | 10 |
| A-ser-mgmt | 11 | MS | 00xx | 00 |
| | | | x111 | 10 |

TABLE 4-continued

1 Bit-Per-TBus-Cycle IFA State Machine

| state name | state id | T-bus symbol classes | coding | next state |
|---|---|---|---|---|
| | | | all else | 11 |

The dominant T-bus symbol is decoded based on the state of the IFA's four-state finite state machine as shown in Table 5.

TABLE 5

1 Bit-Per-TBus-Cycle TBus Decoding

| T-bus Coding | Tx'Sym Coding | | | |
|---|---|---|---|---|
| | Idle State | Line State | Parallel Mgmt State | Serial Mgmt State |
| 0000 | 1111 S | 1111 S | 1111 S | 1111 S |
| 1000 | | 1000 0 | 0011 E | 0000 m0 |
| 1001 | | 1001 1 | 0101 L | 0001 m1 |
| 1011 | 101x P | 101x P | 0111 R | |
| 1111 | 1111 S | 110x N | 0001 m1 | 0001 m1 |

Each of the IFBs uses a six-state finite state machine, and a FIFO storing a small number of the TBC's output symbols, to classify and encode the output of the TBC, to manage the depth of the FIFO, and to determine the encoded symbol to impress on the T bus during the next T-bus cycle.

The IFB's states are:

B-idle—The TBC is idle; the T bus is undriven.

B-line—The TBC is sending MAC (Medium Access Control) symbols to the modem.

B-line-overrun—The TBC is attempting to send MAC symbols to the modem, but the initial part of the transmission was lost due to another TBC's use of the modem. If the modem becomes available before the TBC's transmission ceases, then Preamble symbols are sent in lieu of the TBC's transmission to insure that the TBC's activity is reflected by activity on the medium.

B-par-mgmt—The TBC is sending parallel modem-management symbols to the modem. The initial symbol of this transmission is deliberately discarded.

B-ser-mgmt—The TBC is sending serial modem-management symbols to the modem.

B-mgmt-overrun—The TBC is attempting to send modem-management symbols to the modem, but the initial part of the transmission was lost due to another TBC's use of the modem. The remainder of the modem-control transmission is ignored.

In the Table 6, the status was_dominant in the transition conditions reflects whether the T bus matched the state driven by this IFB on the prior cycle (i.e., whether this IFB's T-bus symbol was dominant on the last cycle). This dominance assessment must be delayed from the assertion of the T-bus state driven by IFB by at least $2*T_{pd}$ from the time when the T bus is driven to account for bus propagation delays and clock distribution skew between the various IFBs (where $T_{pd}$ is the sum of the worst-case one-way end-to-end line driver, line receiver, and propagation delays of the bus). In Table 6, the variable f designates the depth of the FIFO for the next cycle's encoding operation, whereas $TA_f$ designates the fth entry in the FIFO (designated herein as TA). The variable T designates the output of the T-bus, and so T:=I indicates that the T-bus is driven with the symbol I (inactive), and is not really driven at all by this IFB.

TABLE 6

IFB State Machine

| state name | state id | transition condition | next state | actions taken on transition |
|---|---|---|---|---|
| | | reset | 0000 | T: = I (undriven); f: = 1 |
| B-idle | 0000 | (class (TAf) = I) | 0000 | T: = I (undriven); f: = 1 |
| | | (class (TAf) = D)*/was_dominant | 1001 | T: = I (undriven); f: = 1 |
| | | (class (TAf) = Mx)*/was_dominant | 1010 | T: = I (undriven); f: = 1 |
| | | (class (TAf) = D)*was_dominant | 0001 | T: = P; f: = 1 |
| | | (class (TAf) = MP)*was_dominant | 0010 | T: = M; f = 1 |
| | | (class (TAf) = MS)*was_dominant | 0010 | T: = M; f: = 2 |
| B-line | 0001 | (class (TAf) = I) | 0000 | T: = I (undriven); f: = 1 |
| | | (class (TAf) = Mx) | 1010 | T: = I (undriven); f: = 1 |
| | | (class (TAf) = D)*/was_dominant | 1001 | T: = I (undriven); f: = 1 |
| | | (class (TAf) = D)*was_dominant | 0001 | T: = encode(TAf) |
| B-line-overrun | 1001 | (class (TAf) = I) | 0000 | T: = I (undriven); f: = 1 |
| | | (class (TAf) = Mx) | 1010 | T: = I (undriven); f: = 1 |
| | | (class (TAf) = D)*/was_dominant | 1001 | T: = I (undriven); f: = 1 |
| | | (class (TAf) = D)*was_dominant | 1001 | T: = P; f: = 1 |
| B-par-mgmt | 0010 | (class (TAf) = I) | 0000 | T: = I (undriven); f: = 1 |
| | | (class (TAf) = D) | 1001 | T: = I (undriven); f: = 1 |
| | | (class (TAf) = Mx)*/was_dominant | 1010 | T: = I (undriven); f: = 1 |
| | | (class (TAf) = MP)*was_dominant | 0010 | T: = encode(TAf) |
| | | (class (TAf) = MS)*was_dominant | 0110 | T: = M; f: = f + 1 |
| B-ser-mgmt | 0110 | (class (TAf) = I) | 0000 | T: = I (undriven); f: = 1 |
| | | (class (TAf) = D) | 1001 | T: = I (undriven); f: = 1 |
| | | (class (TAf) = Mx)*/was_dominant | 1010 | T: = I (undriven); f: = 1 |
| | | (class (TAf) = MP)*was_dominant | 0010 | T: = M; f: = 1 |
| | | (class (TAf) = MS)*was_dominant | 0110 | T: = encode(TAf) |
| B-mgmt-overrun | 1010 | (class (TAf) = I) | 0000 | T: = I (undriven); f: = 1 |
| | | (class (TAf) = D) | 1001 | T: = I (undriven); f: = 1 |
| | | (class (TAf) = Mx) | 1010 | T: = I (undriven); f: = 1 |

When the modem's data rate and the end-to-end propagation delays between the IFA and IFBs, or among the IFBs, require a T-bus cycle time greater than the modem's symbol period, then more than one bit must be encoded and transmitted each T-bus cycle The IFA state machine of Table 4 and the IFB state machine of Table 5 also function in these cases, although some adaptation may be necessary. The IFA state machine of Table 4 must be adapted to the changed T-bus symbol encoding, after which the serial and parallel management states can be merged. The IFB state machine of Table 6 can function unchanged, but its FIFO now works in symbol pairs, and so must be preceded by additional logic which aligns and pairs the symbols output by the TBC into the pairings shown in Table 7. In essence, symbols destined for I or Mp class pairings are doubled or deleted (ignored) as necessary to form the pairings. Symbols destined for the D or $M_s$ classes are paired from first reception, and any odd terminal symbol can be either doubled or deleted. The TxSym encoding, T-bus dominance sets, T-bus decoding, and IFA state machines for 2 bits-per-T-bus cycle operation are shown in Table 7. The dominance sets of concurrently-impressible symbol pairs are shown in Table 8.

TABLE 7

2 Bits-Per-TBus-Cycle TxSym Encoding

| Abbreviation | 802.4-based symbol pair | TxSym encoding 1st | TxSym encoding 2nd | symbol class | T-bus encoding |
|---|---|---|---|---|---|
| SS | Silence, Silence | 111x, | 111x | I | 00000 |
| PP | Preamble, Preamble | 101x, | 101x | D | 10100 |
| NN | Non_data, Non_data | 110x, | 110x | D | 11111 |
| N0 | Non_data, Zero | 110x, | 1000 | D | 11000 |
| N1 | Non_data, One | 110x, | 1001 | D | 11001 |
| 0N | Zero, Non_data | 1000, | 110x | D | 11010 |
| 1N | One, Non_data | 1001, | 110x | D | 11011 |
| 00 | Zero, Zero | 1000, | 1000 | D | 10000 |
| 01 | Zero, One | 1000, | 1001 | D | 10001 |
| 10 | One, Zero | 1001, | 1000 | D | 10011 |
| 11 | One, One | 1001, | 1001 | D | 10111 |
| RR | Reset | 0111, | 0111 | MP | 11011 |
| LL | disable Loopback | 0101, | 0101 | MP | 11001 |
| EE | Enable transmitter | 0011, | 0011 | MP | 11000 |
| m0m0 | Serial SM zero, zero | 0000, | 0000 | MS | 10000 |
| m0m1 | Serial SM zero, one | 0000, | 0001 | MS | 10001 |
| m1m0 | Serial SM one, zero | 0001, | 0000 | MS | 10011 |
| m1m1 | Serial SM one, one | 0001, | 0001 | MS | 10111 |
| MM | modem control marker | none | | M | 11111 |

TABLE 8

2 Bits-Per-TBus-Cycle Dominance Sets

| set | class |
|---|---|
| {SS < PP < MM} | I |
| {SS < PP < NN} | $D_0$ |
| {SS < 00 < 01 < 11 < 10 < NN} | $D_1$ |
| {SS < 0N < 1N < NN} | $D_2$ |
| {SS < N0 < N1 < NN} | $D_3$ |
| {SS < EE < LL < RR < MM} | MP |
| {SS < m0m0 < m0m1 < m1m1 < m1m0 < MM} | MS |

The constraints of the 802.4 protocol ensure that when any IFB which is actively driving the T bus chooses a symbol from one $D_i$ set, all other IFBs which are actively driving the T bus either will all chose symbols from the same $D_i$ set, or that one or more will choose the symbol pair NN, which is dominant in all the $D_i$ sets. The symbol pair SS, in which the T bus is undriven, is the least element of all sets and represents all the IFBs which are no longer driving the T bus. Tables 9 and 10 also reflect this partitioning into dominance sets.

The dominant symbol pair of those concurrently impressed on the T bus is received by the IFA and all IFBs compare it to the symbol pair which they are impressing to determine whether or not they were dominant during the preceding T bus cycle. The IFA tracks the encoding state (reference Table 9) of the dominant IFB(s) via a three-state finite state machine, and decodes the dominant symbol pair for presentation to the attached modem based on the current state of that 3-state machine. The IFA's states are:

A-idle—the T bus is idle; Silence is reported to the modem.

A-line—The T bus is being used to send MAC (Medium Access Control) symbols through the modem to the connected medium.

A-mgmt—The T bus is being used to send modem-management symbols to the modem.

The dominant T-bus symbol is decoded based on the state of the IFA's three-state finite state machine as shown in Table 10.

TABLE 9

2 Bits-Per-TBus-Cycle IFA State Machine

| state name | state id | T-bus symbol classes | coding | next state |
|---|---|---|---|---|
| | | | reset | 00 |
| A-idle | 001 | I | 00xxx | 00 |
| | | | x1xxx | 10 |
| | | | 10xxx | 01 |
| A-line | 010 | D | 00xxx | 00 |
| | | | all else | 01 |
| A-mgmt | 100 | M | 00xxx | 00 |
| | | | all else | 10 |

TABLE 10

2 Bits-Per-TBus-Cycle TBus Decoding

Tx'Sym Coding

| T-bus Coding | A-idle State 1st | 2nd | | A-line State 1st | 2nd | | A-mgmt State 1st | 2nd | |
|---|---|---|---|---|---|---|---|---|---|
| 00000 | 1111, | 1111 | SS | 1111, | 1111 | SS | 1111, | 1111 | SS |
| 10000 | | | | 1000, | 1000 | 00 | 0000, | 0000 | m0m0 |
| 10001 | | | | 1000, | 1001 | 01 | 0000, | 0001 | m0m1 |
| 10011 | | | | 1001, | 1001 | 11 | 0001, | 0001 | m1m1 |
| 10111 | | | | 1001, | 1000 | 10 | 0001, | 0000 | m1m0 |
| 10100 | 101x, | 101x | PP | 101x, | 101x | PP | | | |
| 11000 | | | | 110x, | 1000 | N0 | 0011, | 0011 | EE |
| 11001 | | | | 110x, | 1001 | N1 | 0101, | 0101 | LL |
| 11010 | | | | 1000, | 110x | 0N | | | |
| 11011 | | | | 1001, | 110x | 1N | 0111, | 0111 | RR |
| 11111 | 1111, | 1111 | SS | 110x, | 110x | NN | 0001, | 0001 | m1m1 |

Figure 6:
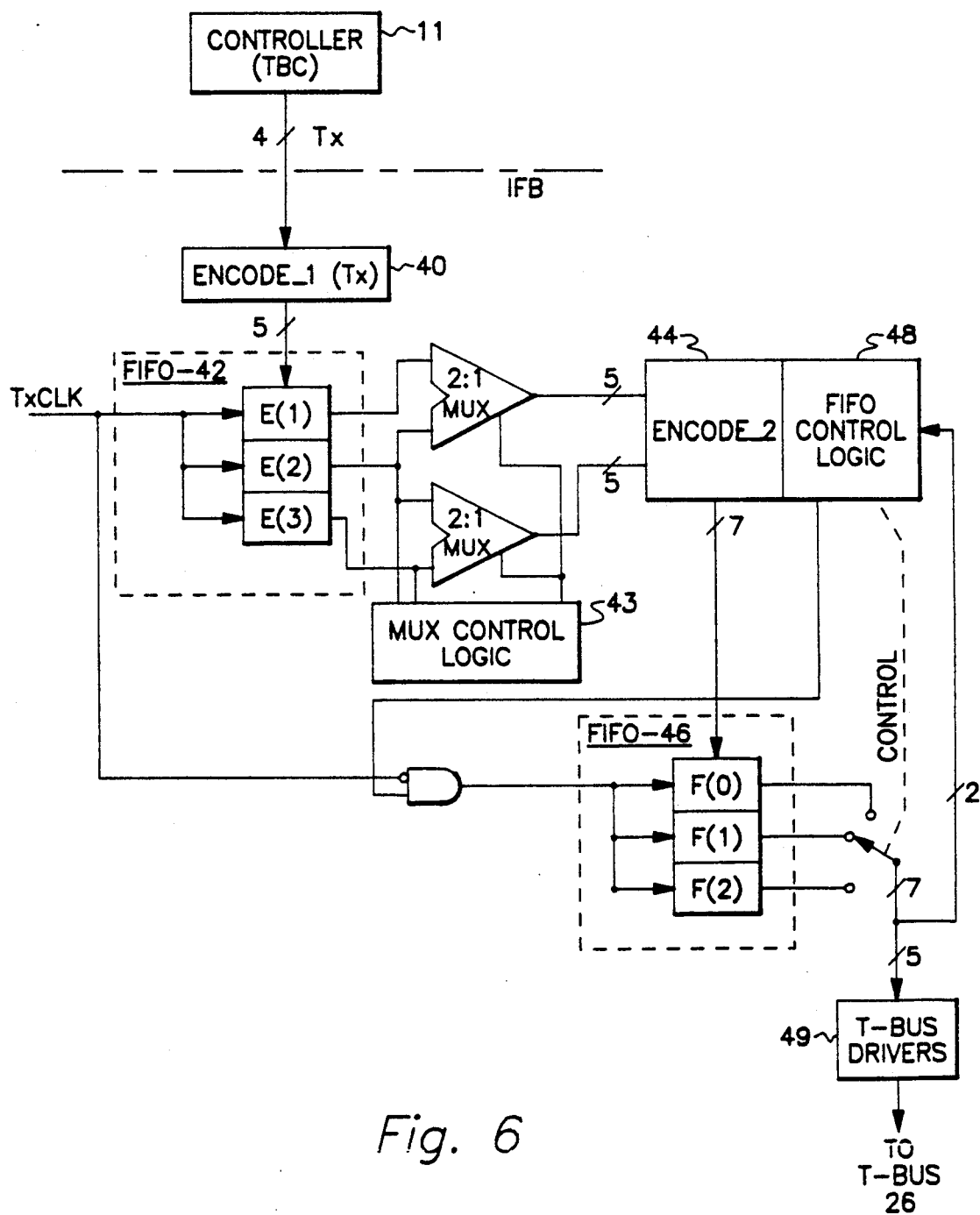
FIG. 6 shows a functional block diagram of the encoding of the controller transmissions by the interface apparatus of the preferred embodiment of the present invention.

Referring to FIG. 6, there is shown a functional diagram of the encoding of the IFB 24 for the two-bits-per-cycle case. The controller (TBC) 11 is transmitting symbols to a first encoder 40 of the corresponding IFB 24. The symbol that comes from the TBC 11 (4 wide) is encoded by the first encoder 40 into a five-wide symbol, encode-1(Tx), and is stored in a three-deep FIFO 42. The three-deep FIFO 42 is clocked every clock TxClk and is, in the preferred embodiment of the present invention, a shift register. Either the first and second, or the second and third, elements of this FIFO 42, as selected by control logic 43, are recoded in a second encoder 44, the output of the second encoder 44 being coupled to a second FIFO 46 (the second FIFO 46 of the preferred embodiment of the present invention being a three-deep shift register). The second encoder 44 encodes (or recodes) the output of the three-deep FIFO 42 into a 7-bit pair of elements and stores the result therefrom into the second FIFO 46. One of the elements F(0), F(1), or F(2) is chosen by a FIFO control logic unit (FCL) 48 for transmission onto the T-bus 26 via T-bus drivers 49.

Every symbol that comes from the TBC 11 is encoded (i.e., classified) and in the process some changes are made. The first level of encoding (via encoder 40) occurs every clock, TxClk. When there is an unspecified bit in the output symbol of the TBC 11, the bit is driven to a known value. Otherwise, the first level of encoding is basically a classification, i.e., serial management, parallel management, silence, or data non-silence. The control logic 43 monitors these recoded symbols, and presents them as pairs (when possible) to the second encoder. The second level of encoding (via second encoder 44) is selectively clocked by TxClk and an enable term from the FIFO control logic unit 48; and any position can be read and outputted. The FCL 48 monitors the first encoder output, in accordance with Table 6, to determine when to activate the second encoder. The symbols are paired by the second level of encoding under control of FCL 48, the encoding being performed in accordance with the information of Appendix C.

Figure 7:
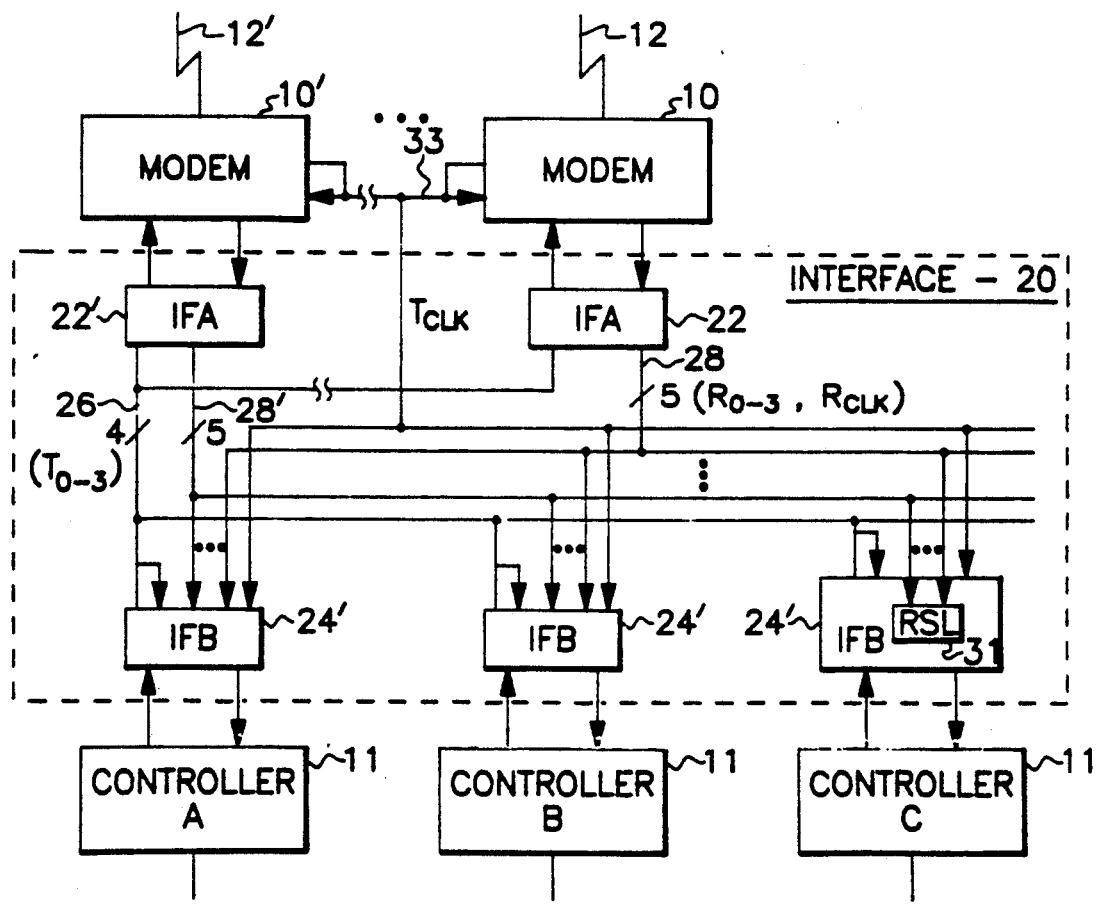
FIG. 7 shows a block diagram of an alternative embodiment of the present invention which includes a plurality of modems.

Referring to FIG. 7, there is shown an alternative embodiment of the present invention, in which a plurality of modems 10 (including a corresponding IFA 22), each having a single independent receiver, is each connected to a corresponding receive bus 28. Each receive bus is connected to a second plurality of controllers 11 via a corresponding IFB 24'. Each IFB 24' includes receiver selection logic (RSL) 31, such that received symbols are presented to the IFB 24' from only one modem at a time. Generally, modems meeting the standard include a locally originated transmit clock. In the embodiment of FIG. 6, a single TClk line 33 is shown. The exact implementation of TClk generation is not relevant to the present invention and will not be discussed further; however, it is to be noted that some method of providing all of the modems 10 with a single common TClk must be employed, a variety of methods being generally well known in the art.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

APPENDIX A1

1 bit/symbol - Parallel Logical Form of the Interfaces

In the following, the subscript i (symbol bit weight) has the range $0 \leq i \leq 3$.
Clocks for registered state data are shown in the right-hand margin.

Nomenclature

| | | |
|---|---|---|
| $X_{abc}$ is a compact way of writing | | $X_a*/X_b*X_c$ |
| $/X_{abc}$ is a compact way of writing | | $/(X_a*/X_b*X_c) = /X_a + X_b + /X_c$ |
| Modem Interface Equations | | |
| RClk | := Rx'Clk | --bus clock = modem clock |
| $R_i$ | := $Rx'Sym_i$ | --bus symbol = modem symbol |
| TClk | := Tx'Clk | --bus clock = modem clock |

APPENDIX A1-continued

1 bit/symbol - Parallel Logical Form of the Interfaces

--register to record T-bus state at end of IFB assertion cycle

| | | | |
|---|---|---|---|
| $U_i$ | $:= T_i$ | | ↑ TClk |
| --IFA state | | | |
| $K_0$ | $:=$ reset $+ U_{32}$ | | ↓ TClk |
| $K_1$ | $:= /\text{reset}*K_0*U_{32} + /\text{reset}*K_1*/U_{32}$ | | ↓ TClk |
| $K_2$ | $:= /\text{reset}*K_0*U_2 + /\text{reset}*K_2*/U_{32} + /\text{reset}*K_3*U_{210}$ | | ↓ TClk |
| $K_3$ | $:= /\text{reset}*K_3/U_{32} + /\text{reset}*K_2*U_{210}$ | | ↓ TClk |
| --decoded T-bus symbol and IFA output to modem | | | |
| $Tx'Sym_i$ | $:= (U_{3210} + U_{32}*K_0)*\{1110\}_i$ | --{S} | ↓ Tx'Clk |
| | $+ (U_{32}*K_0 + U_{321}*K_1)*\{1010\}_i$ | --{P} | |
| | $+ U_{32}*K_1*\{1100\}_i$ | --{N} | |
| | $+ U_{321}*K_1*\{100|U_0\}_i$ | --{0,1} | |
| | $+ U_{32}*K_2*\{0|U_0|U_{10}|1\}_i$ | --{E,L,R} | |
| | $+ U_{32}*K_2*\{0001\}_i$ | --{m1} | |
| | $+ U_3*K_3*\{000|U_0\}_i$ | --{m0,m1} | |

Modem Eliminator Equations

| | | | |
|---|---|---|---|
| RClk | $=$ TClk $:=$ local oscillator | | |
| --register to record T-bus state at end of IFB assertion cycle | | | |
| $U_i$ | $:= T_i$ | | ↑ TClk |
| --IFA state | | | |
| $K_0$ | $:=$ reset $+ U_{32}$ | | ↓ TClk |
| $K_1$ | $:= /\text{reset}*K_0*U_{32} + /\text{reset}*K_1*/U_{32}$ | | ↓ TClk |
| $K_2$ | $:= /\text{reset}*K_0*U_2 + /\text{reset}*K_2*/U_{32} + /\text{reset}*K_3*U_{210}$ | | ↓ TClk |
| $K_3$ | $:= /\text{reset}*K_3*/U_{32} + /\text{reset}*K_2*U_{210}$ | | ↓ TClk |
| --decoded T-bus symbol, recoded for loopback on R-bus; IFA loopback output to IFB | | | |
| $R_i$ | $:= (U_3 + U_{32}*K_0)*\{1110\}_i$ | --{S} | ↓ TClk |
| | $+ (U_{32}*K_0 + U_{321}*K_1)*\{1000\}_i$ | --{P} → {0} | |
| | $+ U_{32}*K_1*\{1100\}_i$ | --{N} | |
| | $+ U_{31}*K_1*\{100|U_0\}_i$ | --{0,1} | |
| | $+ U_3*K_2*\{0|U_2|U_2|1\}_i$ | --{E,L,R,m1} → {ack} | |
| | $+ U_3*K_3*\{010|U_0\}_i$ | --{m0m1} → {nak} | |

In the following, the subscripts i (symbol bit weight) and k (encoded Tx--symbol bit weight) have the ranges $0 \leq i \leq 3$ and $0 \leq k \leq 5$, respectively.
Clocks for registered state data are shown in the right--hand margin.

TBC Interface Equations

| | | | |
|---|---|---|---|
| RxClk | $:=$ RClk | --inverted clock for TBC | |
| --IFB T-bus state synchronized for R-bus use | | | |
| $J_1$ | $:= I_1$ | --synchronizer!! | ↑ RClk |
| $J_3$ | $:= I_3A$ | --synchronizer!! | ↑ RClk |
| --IfB output to TBC | | | |
| $RxSym_i$ | $:= [J_{31} + J_3*R_2 + R_{3210}]*R_i$ | ↑ RClk | |
| | $+ J_{31}*/R_{3210}*\{0100\}_i + J_3*(R_{32} + R_{31} + R_{30})*\{1010\}_i$ | | |
| TxClk | $:=$ TClk | --non-inverted clock for TBC | |
| dTClk | $:= ////\text{TClk}$ | --delayed version of TClk | |
| --three-stage shift register holding recoded symbols for possible T-bus transmission | | | |
| $F[0]_k$ | $:=$ encode$(Tx)_k$ | | ↑ TxClk |
| $F[1]_k$ | $:= F[0]_k$ | | ↑ TxClk |
| $F[2]_k$ | $:= F[1]_k$ | | ↑ TxClk |
| --control of F[f] "digital delay-line" depth via 2-bit synchronous counter f | | | |
| f.clear | $:=$ reset $+/\text{wd} + /F[f]_{54} + /I_{31}$ | | ↑ dTClk |
| f.inc | $:= /\text{reset}*F[f]_{54}*(I_{210}+\text{wd}*I_{321})$ | | ↑ dTClk |
| --IFB state | | | |
| $I_0$ | $:= /\text{reset}*F[f]_{54}$ | | ↑ dTClk |
| $I_1$ | $:= /\text{reset}*F[f]_5$ | | ↑ dTClk |
| $I_2$ | $:= /\text{reset}*F[f]_{54}*I_{31}$ | | ↑ dTClk |
| $I_3$ | $:= /\text{reset}*/F[f]_{54}*(I_3+/\text{wd})$ | | ↑ dTClk |
| $I_3A$ | $:= /\text{reset}*F[f]_5*(I_3+/\text{wd})$ | --==glitch-free$I_1*I_3$ | ↑ dTClk |
| --IFB output to T-bus | | | |
| $Tout_i$ | $:= /\text{reset}*\text{wd}*[(I_{10}+I_{30})*F[f]_{54}*\{1011\}_i$ | | ↑ dTClk |
| | $+ (I_{10}*F[f]_5 + I_{321}*F[f]_{54} + I_2*F[f]_{54})*\{1111\}_i$ | | |
| | $+ (I_{30}*F[f]_{54} + I_{321}*F[f]_{54} + I_2*F[f]_{54})*\{F[f]\}_i]$ | | |
| --IFB assessment of whether its asserted T-bus symbol was dominant | | | |
| wd | $:= (T=Tout)$ | | ↑ TClk |
| --classification and recoding of TBC output | | | |
| encode$(Tx)_k$ | $:= \{Tx_3,$ | --bit 5 | |
| | $Tx_{321}+Tx_{32}+Tx_{31},$ | --bit 4 | |
| | $/Tx_{321},$ | --bit 3 | |
| | $Tx_{321},$ | --bit 2 | |
| | $Tx_{321}+Tx_{321}+Tx_{321},$ | --bit 1 | |
| | $Tx_{210}+Tx_{32}+Tx_{321}+Tx_{321}\}_k$ | --bit 0 | |

APPENDIX A2

2 bits/symbol--Parallel Logical Form of the Interfaces

In the following, the subscript i and k have the ranges $0 \leq i \leq 3$ (symbol bit weight)
and $0 \leq j \leq 4$ (encoded Tx--symbol bit weight), respectively.

APPENDIX A2-continued

2 bits/symbol--Parallel Logical Form of the Interfaces

Clocks for registered state data are shown in the right--hand margin.

Nomenclature

$X_{abc}$ is a compact way of writing $X_a{}^*/X_b{}^*X_c$
$/X_{abc}$ is a compact way of writing $/(X_a{}^*/X_b{}^*X_c) = /X_a + X_b + /X_c$

Modem Interface Equations

| | | | |
|---|---|---|---|
| RClk | := Rx'Clk | --bus clock = modem clock | |
| $R_i$ | := Rx'Sym$_i$ | --bus symbol = modem symbol | |
| TClk | := Tx'Clk | --modem clock | |
| TClk2 | := /TClk2 | --half-frequency T--bus clock | ↓ TClk |

--register to record T-bus state at end of IFB assertion cycle

| | | | |
|---|---|---|---|
| $U_j$ | := $T_j$ | | ↑ TClk2 |

--IFA state

| | | | |
|---|---|---|---|
| $K_0$ | := reset + $U_{43}$ | | ↑ (TClk*TClk2) |
| $K_1$ | := /reset*$K_0$*$U_{43}$ + /reset*$K_1$*/$U_{43}$ | | ↑ (TClk*TClk2) |
| $K_2$ | := /reset*$K_0$*$U_3$ + /reset*$K_2$*/$U_{43}$ | | ↑ (TClk*TClk2) |

--decoded T-bus symbol pair

| | | | |
|---|---|---|---|
| $W_{7-0}$ | := $(U_{43} + U_{43}{}^*K_0)^*\{1110\}^2$ | --{SS} | ↑ (TClk*TClk2) |
| | + $(U_{43}{}^*K_0 + U_{321}{}^*K_1)^*\{1010\}^2$ | --{PP} | |
| | + $U_{32}{}^*K_1{}^*\{1100\}^2$ | --{NN} | |
| | + $U_{32}{}^*K_1{}^*\{1100\}\{100|U_0\}$ | --{N0,N1} | |
| | + $U_{321}{}^*K_1{}^*\{100|U_0\}\{1100\}$ | --{0N,1N} | |
| | + $U_{432}{}^*K_0{}^*\{K_1|00|U_1\}\{K_1|00|U_{10}\}$ | --{00,01,10} and | |
| | | --{m0m0,m0m1,m1m0} | |
| | + $U_{321}{}^*K_0{}^*\{K_1|001\}\{K_1|001\}$ | --{11} and {m1m1} | |
| | + $U_3{}^*K_2{}^*\{0|U_{20}|U_{210}|1\}^2$ | --{EE,LL,RR} | |

--IFA output to modem

| | | | |
|---|---|---|---|
| Tx'Sym$_i$ | := $W_{4+i}{}^*$TClk2 + $W_i{}^*$/TClk2 | | ↓ Tx'Clk |

Modem Eliminator Equations

| | | | |
|---|---|---|---|
| RClk | = TClk := local oscillator | | |
| TClk2 | := /TClk2 | --half-frequency T-bus clock | ↓ TClk |

--register to record T-bus state at end of IFB assertion cycle

| | | | |
|---|---|---|---|
| $U_j$ | := $T_j$ | | ↑ TClk2 |

--IFA state

| | | | |
|---|---|---|---|
| $K_0$ | := reset + $U_{43}$ | | ↑ (TClk*TClk2) |
| $K_1$ | := /reset*$K_0$*$U_{43}$ + /reset*$K_1$*/$U_{43}$ | | ↑ (TClk*TClk2) |
| $K_2$ | := /reset*$K_0$*$U_3$ + /reset*$K_2$*/$U_{43}$ | | ↑ (TClk*TClk2) |

--decoded T-bus symbol pair, recoded for loopback on R-bus

| | | | |
|---|---|---|---|
| $W_{7-0}$ | := $(U_{43} + U_{43}{}^*K_0)^*\{1110\}^2$ | --{SS} | ↑ (TClk*TClk2) |
| | + $(U_{43}{}^*K_0 + U_{321}{}^*K_1)^*\{1000\}^2$ | --{PP}    →{00} | |
| | + $U_{32}{}^*K_1{}^*\{1100\}^2$ | --{NN} | |
| | + $U_{321}{}^*K_1{}^*\{1100\}\{100|U_0\}$ | --{N0,N1} | |
| | + $U_{321}{}^*K_1{}^*\{100|U_0\}\{1100\}$ | --{0N,1N} | |
| | + $U_{432}{}^*K_1{}^*\{100|U_1\}\{100|U_{10}\}$ | --{00,01,10} | |
| | + $U_{321}{}^*K_1{}^*\{1001\}\{1001\}$ | --{11} | |
| | + $U_{43}{}^*K_2{}^*\{0010\}$ | --{m0,m1}$^2$    →{nak}$^2$ | |
| | + $U_3{}^*K_2{}^*\{0100\}^2$ | --{EE,LL,RR}    →{ack}$^2$ | |

--IFA loopback output to IFB

| | | | |
|---|---|---|---|
| $R_i$ | := $W_{4+i}{}^*$TClk2 + $W_i{}^*$/TClk2 | | ↓ Tx'Clk |

In the following, the subscripts i, j and k have the ranges $0 \leq i \leq 3$ (symbol bit weight), and $0 \leq j \leq 4$ and $0 \leq k \leq 6$ (encoded Tx--symbol bit weights), respectively.
Clocks for registered state data are shown in the right--hand margin.

TBC Interface Equations

| | | | |
|---|---|---|---|
| RxClk | := /RClk | --inverted clock for TBC | |

--IFB T-bus state synchronized for R-bus use

| | | | |
|---|---|---|---|
| $J_1$ | := $I_1$ | --synchronizer!! | ↑ RClk |
| $J_3$ | := $I_3$A | --synchronizer!! | ↑ RClk |

--IFB output to TBC

| | | | |
|---|---|---|---|
| RxSym$_i$ | := [$J_{31}$ + $J_3{}^*R_2$ + $R_{3210}$]*$R_i$    ↑ RClk | | |
| | + $J_{31}{}^*/R_{3210}{}^*\{0100\}_i$ + $J_3{}^*(R_{32}+R_{31}+R_{30})^*\{1010\}_i$ | | |
| TxClk | := TClk | --clock for TBC | |
| TClk2 | := TClk2 | | |
| dTClk2 | := ////TClk2 | --delayed version of TClk2 | |

--three-stage shift register holding slightly-recoded TBC output

| | | | |
|---|---|---|---|
| D[0]$_j$ | := encode_1(Tx)$_j$ | | ↑ TxClk |
| D[1]$_j$ | := D[0]$_j$ | | ↑ TxClk |
| D[2]$_j$ | := D[1]$_j$ | | ↑ TxClk |

--multiplexer on three-stage shift register output, and its control

| | | | |
|---|---|---|---|
| d | := /reset*/d*D[1]$_4$*D[0]$_4$ + /reset*d*D[2]$_4$ | | ↑ TxClk |
| $E_j$ | := /d•D[0]$_j$+d•D[1]$_j$ | --:= D[d]$_j$ | |
| $E_{j+5}$ | := /d•D[1]$_j$+d•D[2]$_j$ | --:= D[d+1]$_j$ | |

--three-stage shift register holding recoded symbol pairs for possible T-bus transmission

| | | | |
|---|---|---|---|
| F[0]$_k$ | := encode_2(E$_{9-0}$)$_k$ | | ↑ TClk2 |
| F[1]$_k$ | := F[0]$_k$ | | ↑ TClk2 |
| F[2]$_k$ | := F[1]$_k$ | | ↑ TClk2 |

--control of F[f] "digital delay-line" depth via 2-bit synchronous counter f

| | | | |
|---|---|---|---|
| f.clear | := reset+/wd+/F[f]$_{65}$+/I$_{31}$ | | ↑ dTClk2 |
| f.inc | := /reset*F[f]$_{65}$*(I$_{210}$+wd*I$_{321}$) | | ↑ dTClk2 |

--IFB state

APPENDIX A2-continued

2 bits/symbol--Parallel Logical Form of the Interfaces

| | | | |
|---|---|---|---|
| $I_0$ | := /reset*F[f]$_{65}$ | | ↑ dTClk2 |
| $I_1$ | := /reset*F[f]$_6$ | | ↑ dTClk2 |
| $I_2$ | := /reset*F[f]$_{65}$*I$_{31}$ | | ↑ dTClk2 |
| $I_3$ | := /reset*F[f]$_{65}$*(I$_3$+/wd) | | ↑ dTClk2 |
| $I_3A$ | := /reset*F[f]$_6$*(I$_3$+/wd) | --==glitch-free I$_1$*I$_3$ | ↑ dTClk2 |

--IFB output to T-bus

| | | |
|---|---|---|
| Tout$_k$ | := /reset*wd*(I$_{10}$+I$_{30}$)*F[f]$_{65}$*{10100}$_k$ | ↑ dTClk2 |
| | + /reset*wd*(I$_{10}$*F[f]$_6$ + I$_{321}$*F[f]$_{65}$ + I$_2$*F[f]$_{65}$)*{11111}$_k$ | |
| | + /reset*wd*(I$_{30}$*F[f]$_{65}$ + I$_{321}$*F[f]$_{65}$ + I$_2$*F[f]$_{65}$)*{F[f]}$_k$ | |

--IFB assessment of whether its asserted T-bus symbol was dominant

| | | |
|---|---|---|
| wd | := (T=Tout) | ↑ TClk2 |

--first-level classification and recoding of TBC output encode_1(Tx)$_j$ := {Tx$_{32}$+Tx$_{31}$+Tx$_{21}$,   --bit 4
   Tx$_3$,   --bit 3
   Tx$_2$,   --bit 2
   Tx$_1$,   --bit 1
   Tx$_{32}$+Tx$_{31}$+Tx$_{210}$}$_j$   --bit 0

--second-level recoding of TBC output encode_2(E)$_k$ := {E$_{98}$+E$_{98}$,   --bit 6
   E$_9$,   --bit 5
   /E$_{876}$,   --bit 4
   E$_{98}$+E$_{987}$+E$_{982}$,   --bit 3
   E$_{9854}$+E$_{9853}$+E$_{9850}$+E$_{986}$+E$_{9872}$+E$_{98765210}$,   --bit 2
   E$_{985}$+E$_{9876}$+E$_{985}$+E$_{982}$,   --bit 1
   E$_{985}$+E$_{984}$+E$_{983}$+E$_{980}$+E$_{987}$+E$_{985}$+E$_{980}$+E$_{9872}$}$_k$   --bit 0

APPENDIX B

Interface Definitions and Received Symbol Transformation

Interface Definitions

| | | 3210 | | |
|---|---|---|---|---|
| S | = | 111x | -- silence | Tx & Rx |
| N | = | 110x | -- non_data | Tx & Rx |
| D d | = | 100d | -- data d (where d = 0 or 1) | Tx & Rx |
| P | = | 101x | -- pad_idle (preamble) | Tx only |
| B | = | 101x | -- bad_signal | Rx only |
| M | = | 0xxx | -- modem-control signal | Tx & Rx |
| R | = | 0111 | -- station mgmt reset | Tx only |
| L | = | 0101 | -- station mgmt disable loopback | Tx only |
| E | = | 0011 | -- station mgmt enable transmitter | Tx only |
| m d | = | 001d | -- serial station mgmt data d | Tx only |
| Idle | = | 0001 | -- station mgmt "mark" (line idle) | Rx only |
| Ack d | = | 001d | -- station mgmt positive acknowledge, data d | Rx only |
| Nak d | =; | 010d | -- station mgmt negative acknowledge, data d | Rx only |
| PLE | = | 0111 | -- modem-detected (physical layer) error | Rx only |
| RxClk | | | -- rising-edge active, setup = 40% of period, hold = 10 ns | |
| TxClk | | | -- rising-edge active, setup = 35% of period, hold = 5 ns | |

Received Symbol Transformation

The reported receive symbol Rx$_i$ is a function of the received symbol R$_i$ and the interface's transmit state and class of the transmit symbol Tx$_i$:

| Received Symbol | Transmit State and Class of Transmit Symbol | | | | |
|---|---|---|---|---|---|
| | S-copy | | B-pad | | |
| R$_i$ | M | M | M | M | all else |
| M & PLE | R$_i$ | B | NAK$_0$ | B | B |
| PLE | R$_i$ | R$_i$ | R$_i$ | R$_i$ | R$_i$ |
| M | R$_i$ | R$_i$ | NAK$_0$ | R$_i$ | R$_i$ |

APPENDIX C1

1 Bit/Symbol - IFB Encoding encode(Tx) is defined by the following table:

| Tx<br>3210 | F[1]<br>54 3210 | which<br>encodes |
|---|---|---|
| 0000 | 11 1000 | m0 |
| 0001 | 11 1001 | m1 |
| 0011 | 10 1000 | E |
| 0101 | 10 1001 | L |
| 0111 | 10 1011 | R |
| 1000 | 01 1000 | 0 |
| 1001 | 01 1001 | 1 |
| 110x | 01 1111 | N |
| 101x | 01 1011 | P |
| 111x | 00 0000 | S |

APPENDIX C2

2 Bits/Symbol - IFB Encoding encode_1(Tx) is defined by the following table:

| Tx<br>3210 | D[0]<br>43 210 | which<br>encodes |
|---|---|---|
| 0000 | 00 000 | m0 |
| 0001 | 00 001 | m1 |
| 0011 | 10 011 | E |
| 0101 | 10 101 | L |
| 0111 | 10 111 | R |
| 1000 | 01 000 | 0 |
| 1001 | 01 001 | 1 |
| 110x | 01 100 | N |
| 101x | 01 010 | P |
| 111x | 11 110 | S | encode_2(E) is defined by the following table:
   D(d+1)   D(d)

APPENDIX C2-continued

2 Bits/Symbol - IFB Encoding

| 43 210 | 43 210 | | | |
|---|---|---|---|---|
| | E | F[0] | | which |
| 98 765 | 43 210 | 65 43210 | | represents |
| 00 000 | 00 000 | 11 10000 | | m0,m0 |
| 00 000 | 00 001 | 11 10001 | | m0,m1 |
| 00 000 | 01 xxx | 11 10001 | | m0,m1 |
| 00 000 | 1x xxx | 11 10001 | | m0,m1 |
| 00 001 | 00 000 | 11 10011 | | m1,m0 |
| 00 001 | 00 001 | 11 10111 | | m1,m1 |
| 00 001 | 01 xxx | 11 10111 | | m1,m1 |
| 00 001 | 1x xxx | 11 10111 | | m1,m1 |
| 10 011 | 1x xxx | 10 11000 | | E,E |
| 10 011 | 0x xxx | 10 11000 | | E,E |
| 10 101 | 1x xxx | 10 11001 | | L,L |
| 10 101 | 0x xxx | 10 11001 | | L,L |
| 10 111 | 1x xxx | 10 11011 | | R,R |
| 10 111 | 0x xxx | 10 11011 | | R,R |
| 01 000 | 01 000 | 01 10000 | | 0,0 |
| 01 000 | 01 001 | 01 10001 | | 0,1 |
| 01 001 | 01 000 | 01 10011 | | 1,0 |
| 01 001 | 01 001 | 01 10111 | | 1,1 |
| 01 000 | 01 100 | 01 11010 | | 0,N |
| 01 001 | 01 100 | 01 11011 | | 1,N |
| 01 100 | 01 000 | 01 11000 | | N,0 |
| 01 100 | 01 001 | 01 11001 | | N,1 |
| 01 100 | 01 100 | 01 11111 | | N,N |
| 01 010 | 01 010 | 01 10100 | | P,P |
| 11 110 | 1x xxx | 00 00000 | | S,S |
| 11 110 | 0x xxx | 00 00000 | | S,S |

APPENDIX D1

1 bit/symbol - Logical Equation Form of the Interfaces

Modem Interface Equations

Inputs: Tx'Clk, Rx'Clk, Rx'Sym$_3$, Rx'Sym$_2$, Rx'Sym$_1$, Rx'Sym$_0$; /T$_3$, /T$_2$, /T$_1$, /T$_0$
Outputs: TClk, RClk, R$_3$, R$_2$, R$_1$, R$_0$; Tx'Sym$_3$, Tx'Sym$_2$, Tx'Sym$_1$, Tx'Sym$_0$

| | | | |
|---|---|---|---|
| RClk | := Rx'Clk | --bus clock = modem clock | |
| R$_3$ | := Rx'Sym$_3$ | | |
| R$_2$ | := Rx'Sym$_2$ | | |
| R$_1$ | := Rx'Sym$_1$ | | |
| R$_0$ | := Rx'Sym$_0$ | | |
| TClk | := Tx'Clk | --bus clock = modem clock | |

-- register to record T-bus state at end of IFB assertion cycle

| | | |
|---|---|---|
| U$_0$ | := T$_0$ | ↑ TClk |
| U$_1$ | := T$_1$ | ↑ TClk |
| U$_2$ | := T$_2$ | ↑ TClk |
| U$_3$ | := T$_3$ | ↑ TClk |

-- IFA state

| | | |
|---|---|---|
| K$_0$ | := reset + /U$_3$·/U$_2$ | ↓ TClk |
| K$_1$ | := /reset·U$_3$·/U$_2$·K$_0$ + /reset ·U$_3$·K$_1$ + /reset ·U$_2$·K$_1$ | ↓ TClk |
| K$_2$ | := /reset·U$_2$·K$_0$ + /reset ·U$_3$·K$_2$ + /reset ·U$_2$·K$_2$<br>+ /reset ·U$_2$·U$_1$·U$_0$·K$_3$ | ↓ TClk |
| K$_3$ | := /reset ·U$_3$·K$_2$ + /reset ·U$_2$·K$_2$ + /reset ·U$_2$·U$_1$·U$_0$·K$_3$ | ↓ TClk |

-- decoded T-bus symbol; IFA output to modem

| | | |
|---|---|---|
| Tx'Sym$_0$ | := U$_3$·/U$_2$·/U$_1$·U$_0$·K$_1$ + U$_3$·K$_2$ + U$_3$·U$_0$·K$_3$ | ↓ Tx'Clk |
| Tx'Sym$_1$ | := /U$_3$·/U$_2$·/U$_1$·/U$_0$ + U$_3$·K$_0$ + U$_3$·/U$_2$·U$_1$·K$_1$<br>+ U$_3$·/U$_2$·U$_1$·K$_2$ + U$_3$·/U$_2$·/U$_0$·K$_2$ | ↓ Tx'Clk |
| Tx'Sym$_2$ | := /U$_3$·/U$_2$·/U$_1$·/U$_0$ + U$_3$·U$_2$·K$_0$ + U$_3$·U$_2$·K$_1$<br>+ U$_3$·/U$_2$·U$_0$·K$_2$ | ↓ Tx'Clk |
| Tx'Sym$_3$ | := /U$_3$·/U$_2$·/U$_1$·/U$_0$ + U$_3$·K$_0$ + U$_3$·K$_1$ | ↓ Tx'Clk |

Modem Eliminator Equations

Inputs: local clock, /T$_3$, /T$_2$, /T$_1$, /T$_0$
Outputs: TClk, RClk, R$_3$, R$_2$, R$_1$, R$_0$

| | | |
|---|---|---|
| RClk | = TClk := local oscillator | |

-- register to record T-bus state at end of IFB assertion cycle

| | | |
|---|---|---|
| U$_0$ | := T$_0$ | ↑ TClk |
| U$_1$ | := T$_1$ | ↑ TClk |
| U$_2$ | := T$_2$ | ↑ TClk |
| U$_3$ | := T$_3$ | ↑ TClk |

-- IFA state

| | | |
|---|---|---|
| K$_0$ | := reset + /U$_3$·/U$_2$ | ↓ TClk |
| K$_1$ | := /reset·U$_3$·/U$_2$·K$_0$ + /reset ·U$_3$·K$_1$ + /reset ·U$_2$·K$_1$ | ↓ TClk |
| K$_2$ | := /reset·U$_2$·K$_0$ + /reset ·U$_3$·K$_2$ + /reset ·U$_2$·K$_2$<br>+ /reset ·U$_2$·U$_1$·U$_0$·K$_3$ | ↓ TClk |
| K$_3$ | := /reset ·U$_3$·K$_2$ + /reset ·U$_2$·K$_2$ + /reset ·U$_2$·U$_1$·U$_0$·K$_3$ | ↓ TClk |

-- decoded T-bus symbol, recoded for loopback on R-bus; IFA loopback output to IFB

| | | |
|---|---|---|
| R$_0$ | := U$_3$·/U$_1$·U$_0$·K$_1$ + U$_3$·K$_2$ + U$_3$·U$_0$·K$_3$ | ↓ TClk |
| R$_1$ | := /U$_3$ + U$_3$·U$_2$·K$_0$ + U$_3$·/U$_2$·K$_2$ | ↓ TClk |
| R$_2$ | := /U$_3$ + U$_3$·U$_2$ + U$_3$·K$_3$ | ↓ TClk |
| R$_3$ | := /U$_3$ + U$_3$·K$_0$ + U$_3$·K$_1$ | ↓ TClk |

TBC Interface Equations

Inputs: RClk, R$_3$, R$_2$, R$_1$, R$_0$, I$_3$A, I$_1$
Outputs: /RxClk, /RxSym$_3$, /RxSym$_2$, /RxSym$_1$, /RxSym$_0$

| | | |
|---|---|---|
| RxClk | := /RClk | --inverted clock for TBC |

-- IFB T-bus state synchronized for R-bus use

| | | |
|---|---|---|
| J$_1$ | := I$_1$ | -- synchronizer!! | ↑ RClk |
| J$_3$ | := I$_3$A | -- synchronizer!! | ↑ RClk |

-- IFB output to TBC

| | | |
|---|---|---|
| RxSym$_0$ | := J$_3$·/J$_1$·R$_0$ + /J$_3$·R$_2$·R$_0$ + /R$_3$·R$_2$·R$_1$·R$_0$ | ↑ RClk |
| RxSym$_1$ | := J$_3$·/J$_1$·R$_1$ + /J$_3$·R$_2$·R$_1$ + /R$_3$·R$_2$·R$_1$·R$_0$<br>+ /J$_3$·/R$_3$·R$_2$ + /J$_3$·/R$_3$·/R$_1$ + /J$_3$·/R$_3$·/R$_0$ | ↑ RClk |
| RxSym$_2$ | := J$_3$·/J$_1$·R$_2$ + /J$_3$·R$_2$ + /R$_3$·R$_2$·R$_1$·R$_0$<br>+ J$_3$·J$_1$·R$_3$ + J$_3$·J$_1$·R$_2$ + J$_3$·J$_1$·/R$_1$ + J$_3$·J$_1$·/R$_0$ | ↑ RClk |

APPENDIX D1-continued

1 bit/symbol - Logical Equation Form of the Interfaces

| | | |
|---|---|---|
| $RxSym_3$ | := $J_3 \cdot /J_1 \cdot R_3 + /J_3 \cdot R_3 \cdot R_2$ | ↑ RClk |
| | $+ /J_3 \cdot /R_3 \cdot R_2 + /J_3 \cdot /R_3 \cdot /R_1 + J_3 \cdot /R_3 \cdot /R_0$ | |
| Inputs: | TClk, $/T_3$, $/T_2$, $/T_1$, $/T_0$, $TxSym_3$, $TxSym_2$, $TxSym_1$, $TxSym_0$ | |
| Outputs: | TxClk, $/T_3out$, $/T_2out$, $/T_1out$, $/T_0out$, $I_3A$, $I_1$ | |
| TxClk | := TClk | -- clock for TBC |
| dTClk | := ////TClk | -- delayed version of TClk |

-- three-stage shift register holding recoded symbols for possible T-bus transmission

| | | |
|---|---|---|
| $F[0]_0$ | := $/Tx_2 \cdot /Tx_1 \cdot Tx_0 + /Tx_3 \cdot Tx_2 + Tx_3 \cdot /Tx_2 \cdot Tx_1 + Tx_3 \cdot Tx_2 \cdot /Tx_1$ | ↑ TClk |
| $F[0]_1$ | := $/Tx_3 \cdot Tx_2 \cdot Tx_1 + Tx_3 \cdot /Tx_2 \cdot Tx_1 + Tx_3 \cdot Tx_2 \cdot /Tx_1$ | ↑ TClk |
| $F[0]_2$ | := $Tx_3 \cdot Tx_2 \cdot /Tx_1$ | ↑ TClk |
| $F[0]_3$ | := $/Tx_3 + /Tx_2 + /Tx_1$ | ↑ TClk |
| $F[0]_4$ | := $/Tx_3 \cdot /Tx_2 \cdot /Tx_1 + Tx_3 \cdot /Tx_2 + T_{x3} \cdot /Tx_1$ | ↑ TClk |
| $F[0]_5$ | := $/Tx_3$ | ↑ TClk |
| $F[1]_0$ | := $F[0]_0$ | ↑ TClk |
| $F[1]_1$ | := $F[0]_1$ | ↑ TClk |
| $F[1]_2$ | := $F[0]_2$ | ↑ TClk |
| $F[1]_3$ | := $F[0]_3$ | ↑ TClk |
| $F[1]_4$ | := $F[0]_4$ | ↑ TClk |
| $F[1]_5$ | := $F[0]_5$ | ↑ TClk |
| $F[2]_0$ | := $F[1]_0$ | ↑ TClk |
| $F[2]_1$ | := $F[1]_1$ | ↑ TClk |
| $F[2]_2$ | := $F[1]_2$ | ↑ TClk |
| $F[2]_3$ | := $F[1]_3$ | ↑ TClk |
| $F[2]_4$ | := $F[1]_4$ | ↑ TClk |
| $F[2]_5$ | := $F[1]_5$ | ↑ TClk |

-- control of F[f] "digital delay-line" depth via 2-bit synchronous counter f

| | | |
|---|---|---|
| f.clear | := $reset + /wd + F[f]_5 + F[f]_4 + I_3 + /I_1$ | ↑ dTClk |
| f.inc | := $/reset \cdot F[f]_5 \cdot F[f]_4 \cdot /I_2 \cdot /I_1 \cdot /I_0$ | ↑ dTClk |
| | $+ /reset \cdot F[f]_5 \cdot F[f]_4 \cdot wd + /reset \cdot F[f]_5 \cdot F[f]_4 \cdot /I_3 \cdot /I_2 \cdot I_1$ | |

-- IFB state

| | | |
|---|---|---|
| $I_0$ | := $/reset \cdot /F[f]_5 \cdot F[f]_4$ | ↑ dTClk |
| $I_1$ | := $/reset \cdot F[f]_5$ | ↑ dTClk |
| $I_2$ | := $/reset \cdot F[f]_5 \cdot F[f]_4 \cdot /I_3 \cdot I_1$ | ↑ dTClk |
| $I_3$ | := $/reset \cdot (F[f]_5 + F[f]_4) \cdot (I_3 + /wd)$ | ↑ dTClk |
| $I_3A$ | := $/reset \cdot F[f]_5 \cdot (I_3 + /wd)$    -- == glitch-free $I_1 \cdot I_3$ | ↑ dTClk |

--IFB output to T-bus

| | | |
|---|---|---|
| $S_1$ | := $/reset \cdot /I_1 \cdot /I_0 \cdot /F[f]_5 \cdot F[f]_4$ | |
| | $+ /reset \cdot I_3 \cdot I_0 \cdot /F[f]_5 \cdot F[f]_4$ | |
| $S_2$ | := $/reset \cdot /I_1 \cdot /I_0 \cdot F[f]_5$ | |
| | $+ /reset \cdot I_3 \cdot /I_2 \cdot I_1 \cdot F[f]_5 \cdot F[f]_4$ | |
| | $+ /reset \cdot I_2 \cdot F[f]_5 \cdot /F[f]_4$ | |
| $S_3$ | := $/reset \cdot /I_3 \cdot I_0 \cdot /F[f]_5 \cdot F[f]_4$ | |
| | $+ /reset \cdot /I_3 \cdot /I_2 \cdot I_1 \cdot F[f]_5 \cdot /F[f]_4$ | |
| | $+ /reset \cdot I_2 \cdot F[f]_5 \cdot F[f]_4$ | |
| $T_0out$ | := $wd \cdot (s_1 + s_2 + s_3 \cdot F[f]_0)$ | ↑ dTClk |
| $T_1out$ | := $wd \cdot (s_1 + S_2 + s_3 \cdot F[f]_1)$ | ↑ dTClk |
| $T_2out$ | := $wd \cdot (s_2 + s_3 \cdot F[f]_2)$ | ↑ dTClk |
| $T_3out$ | := $wd \cdot (s_1 + s_2 + s_3 \cdot F[f]_3)$ | ↑ dTClk |

-- IFB assessment of whether its asserted T-bus symbol was dominant

| | | |
|---|---|---|
| wd | := $(T_0 \cdot T_0out + /T_0 \cdot /T_0out)$ | ↑ TClk |
| | $\cdot (T_1 \cdot T_1out + /T_1 \cdot /T_1out)$ | |
| | $\cdot (T_2 \cdot T_2out + /T_2 \cdot /T_2out)$ | |
| | $\cdot (T_3 \cdot T_3out + /T_3 \cdot /T_3out)$ | |

APPENDIX D2

2 bits/symbol - Logical Equation Form of the Interfaces

Modem Interface Equations

| | | |
|---|---|---|
| Inputs: | Tx'Clk, Rx'Clk, $Rx'Sym_3$, $Rx'Sym_2$, $Rx'Sym_1$, $Rx'Sym_0$; $/T_4$, $/T_3$, $/T_2$, $/T_1$, $/T_0$ | |
| Outputs: | TClk, RClk, $R_3$, $R_2$, $R_1$, $R_0$; $Tx'Sym_3$, $Tx'Sym_2$, $Tx'Sym_1$, $Tx'Sym_0$ | |
| RClk | := Rx'Clk | -- bus clock = modem clock |
| $R_3$ | := $Rx'Sym_3$ | |
| $R_2$ | := $Rx'Sym_2$ | |
| $R_1$ | := $Rx'Sym_1$ | |
| $R_0$ | := $Rx'Sym_0$ | |
| TClk | := Tx'Clk | -- modem clock |
| TClk2 | := /TClk2 | -- half-frequency T-bus clock    ↓ TClk |

-- register to record T-bus state at end of IFB assertion cycle

| | | |
|---|---|---|
| $U_0$ | := $T_0$ | ↑ TClk2 |
| $U_1$ | := $T_1$ | ↑ TClk2 |
| $U_2$ | := $T_2$ | ↑ TClk2 |
| $U_3$ | := $T_3$ | ↑ TClk2 |
| $U_4$ | := $T_4$ | ↑ TClk2 |

-- IFA state

| | | |
|---|---|---|
| $K_0$ | := $reset + /U_4 \cdot /U_3$ | ↑ (TClk * TClk2) |
| $K_1$ | := $/reset \cdot U_4 \cdot /U_3 \cdot K_0 + /reset \cdot U_4 \cdot K_1 + /reset \cdot U_3 \cdot K_1$ | ↑ (TClk * TClk2) |
| $K_2$ | := $/reset \cdot U_3 \cdot K_0 + /reset \cdot U_4 \cdot K_2 + /reset \cdot U_3 \cdot K_2$ | ↑ (TClk * TClk2) |

-- decoded T-bus symbol pair

| | | |
|---|---|---|
| $W_0$ | := $U_3 \cdot /U_2 \cdot /U_1 \cdot U_0 \cdot K_1 + U_4 \cdot /U_3 \cdot /U_2 \cdot /U_1 \cdot U_0 \cdot K_0$ | ↑ (TClk * TClk2) |

APPENDIX D2-continued

2 bits/symbol - Logical Equation Form of the Interfaces

|  |  |  |
|---|---|---|
|  | $+ \ /U_3 \cdot U_2 \cdot U_1 \cdot /K_0 + U_3 \cdot K_2$ |  |
| $W_4$ | $:= U_3 \cdot /U_2 \cdot U_1 \cdot U_0 \cdot K_1 + U_4 \cdot /U_3 \cdot /U_2 \cdot U_1 \cdot /K_0$ | ↑ (TClk * TClk2) |
|  | $+ \ /U_3 \cdot U_2 \cdot U_1 \cdot /K_0 + U_3 \cdot K_2$ |  |
| $W_5 := W_1$ | $:= /U_4 \cdot /U_3 + U_4 \cdot K_0 + /U_3 \cdot U_2 \cdot /U_1 \cdot K_1$ | ↑ (TClk * TClk2) |
|  | $+ \ U_3 \cdot U_2 \cdot K_2 + U_3 \cdot U_1 \cdot K_2 + U_3 \cdot U_0 \cdot K_2$ |  |
| $W_2$ | $:= /U_4 \cdot /U_3 + U_4 \cdot U_3 \cdot K_0 + U_3 \cdot U_2 \cdot K_1$ | ↑ (TClk * TClk2) |
|  | $+ \ U_3 \cdot /U_2 \cdot U_1 \cdot K_1 + U_3 \cdot /U_2 \cdot U_0 \cdot K_2$ |  |
| $W_6$ | $:= /U_4 \cdot /U_3 + U_4 \cdot U_3 \cdot K_0 + U_3 \cdot /U_2 \cdot K_1$ | ↑ (TClk * TClk2) |
|  | $+ \ U_3 \cdot /U_2 \cdot /U_1 \cdot K_1 + U_3 \cdot /U_2 \cdot U_0 \cdot K_2$ |  |
| $W_7 := W_3$ | $:= /U_4 \cdot /U_3 + U_4 \cdot K_0 + /U_3 \cdot U_2 \cdot /U_1 \cdot K_1 + U_3 \cdot K_1$ | ↑ (TClk * TClk2) |
|  | $+ \ U_4 \cdot /U_3 \cdot U_2 \cdot K_1 \cdot /K_0 + /U_3 \cdot U_2 \cdot U_1 \cdot K_1 \cdot /K_0$ |  |
| -- IFA output to modem |  |  |
| Tx'Sym$_0$ | $:= W_4 \cdot TClk2 + W_0 \cdot /TClk2$ | ↓ Tx'Clk |
| Tx'Sym$_1$ | $:= W_5 \cdot TClk2 + W_1 \cdot /TClk2$ | ↓ Tx'Clk |
| Tx'Sym$_2$ | $:= W_6 \cdot TClk2 + W_2 \cdot /TClk2$ | ↓ Tx'Clk |
| Tx'Sym$_3$ | $:= W_7 \cdot TClk2 + W_3 \cdot /TClk2$ | ↓ Tx'Clk |

Modem Eliminator Equations

| | | |
|---|---|---|
| Inputs: | local clock, $/T_4, /T_3, /T_2, /T_1, /T_0$ | |
| Outputs: | TClk, RClk, $R_3, R_2, R_1, R_0$ | |
| RClk | = TClk := local oscillator | |
| TClk2 | := /TClk2        --half-frequency T-bus clock | ↓ TClk |
| -- register to record T-bus state at end of IFB assertion cycle | | |
| $U_0$ | := $T_0$ | ↑ TClk2 |
| $U_1$ | := $T_1$ | ↑ TClk2 |
| $U_2$ | := $T_2$ | ↑ TClk2 |
| $U_3$ | := $T_3$ | ↑ TClk2 |
| $U_4$ | := $T_4$ | ↑ TClk2 |
| --IFA state | | |
| $K_0$ | $:= $ reset $+ /U_4 \cdot /U_3$ | ↑ (TClk * TClk2) |
| $K_1$ | $:= /$reset$\cdot U_4 \cdot /U_3 \cdot K_0 + /$reset $\cdot U_4 \cdot K_1 + /$reset $\cdot U_3 \cdot K_1$ | ↑ (TClk * TClk2) |
| $K_2$ | $:= /$reset$\cdot U_3 \cdot K_0 + /$reset $\cdot U_4 \cdot K_2 + /$reset $\cdot U_3 \cdot K_2$ | ↑ (TClk * TClk2) |
| -- decoded T-bus symbol pair, recoded for loopback on R-bus | | |
| $W_0$ | $:= U_3 \cdot /U_2 \cdot /U_1 \cdot U_0 \cdot K_1 + U_4 \cdot /U_3 \cdot /U_2 \cdot /U_1 \cdot U_0 \cdot K_1$ | ↑ (TClk * TClk2) |
|  | $+ \ /U_3 \cdot U_2 \cdot U_1 \cdot /K_1$ | |
| $W_4$ | $:= U_3 \cdot /U_2 \cdot U_1 \cdot U_0 \cdot K_1 + U_4 \cdot /U_3 \cdot /U_2 \cdot U_1 \cdot K_1$ | ↑ (TClk * TClk2) |
|  | $+ \ /U_3 \cdot U_2 \cdot U_1 \cdot /K_1$ | |
| $W_5 := W_1$ | $:= /U_4 \cdot /U_3 + U_4 \cdot /U_3 \cdot K_2$ | ↑ (TClk * TClk2) |
| $W_2$ | $:= /U_4 \cdot /U_3 + U_4 \cdot U_3 \cdot K_0 + U_3 \cdot U_2 \cdot K_1$ | ↑ (TClk * TClk2) |
|  | $+ \ U_3 \cdot /U_2 \cdot U_1 \cdot K_1 + U_3 \cdot K_2$ | |
| $W_6$ | $:= /U_4 \cdot /U_3 + U_4 \cdot U_3 \cdot K_0 + U_3 \cdot /U_2 \cdot K_1$ | ↑ (TClk * TClk2) |
|  | $+ \ U_3 \cdot /U_2 \cdot /U_1 \cdot K_1 + U_3 \cdot K_2$ | |
| $W_7 := W_3$ | $:= /U_4 \cdot /U_3 + U_4 \cdot K_0 + U_3 \cdot K_1$ | ↑ (TClk * TClk2) |
|  | $+ \ U_4 \cdot /U_3 \cdot /U_2 \cdot K_1 + /U_3 \cdot U_2 \cdot U_1 \cdot K_1$ | |
| -- IFA loopback output to IFB | | |
| $R_0$ | $:= W_4 \cdot TClk2 + W_0 \cdot /TClk2$ | ↓ Tx'Clk |
| $R_1$ | $:= W_5 \cdot TClk2 + W_1 \cdot /TClk2$ | ↓ Tx'Clk |
| $R_2$ | $:= W_6 \cdot TClk2 + W_2 \cdot /TClk2$ | ↓ Tx'Clk |
| $R_3$ | $:= W_7 \cdot TClk2 + W_3 \cdot /TClk2$ | ↓ Tx'Clk |

TBC Interface Equations

| | | |
|---|---|---|
| Inputs: | RClk, $R_3, R_2, R_1, R_0, I_3A, I_1$ | |
| Outputs: | /RxClk, /RxSym$_3$, /RxSym$_2$, /RxSym$_1$, /RxSym$_0$ | |
| RxClk | := /RClk         -- inverted clock for TBC | |
| -- IFB T-bus state synchronized for R-bus use | | |
| $J_1$ | := $I_1$              -- synchronizer!! | ↑ RClk |
| $J_3$ | := $I_3A$             -- synchronizer!! | ↑ RClk |
| -- IFB output to TBC | | |
| RxSym$_0$ | $:= J_3 \cdot /J_1 \cdot R_0 + /J_3 \cdot R_2 \cdot R_0 + /R_3 \cdot R_2 \cdot R_1 \cdot R_0$ | ↑ RClk |
| RxSym$_1$ | $:= J_3 \cdot /J_1 \cdot R_1 + /J_3 \cdot R_2 \cdot R_1 + /R_3 \cdot R_2 \cdot R_1 \cdot R_0$ | ↑ RClk |
|  | $+ \ /J_3 \cdot /R_3 \cdot /R_2 + /J_3 \cdot /R_3 \cdot /R_1 + /J_3 \cdot /R_3 \cdot /R_0$ | |
| RxSym$_2$ | $:= J_3 \cdot /J_1 \cdot R_2 + /J_3 \cdot R_2 + /R_3 \cdot R_2 \cdot R_1 \cdot R_0$ | ↑ RClk |
|  | $+ \ J_3 \cdot J_1 \cdot R_3 + J_3 \cdot J_1 \cdot /R_2 + J_3 \cdot J_1 \cdot /R_1 + J_3 \cdot J_1 \cdot /R_0$ | |
| RxSym$_3$ | $:= J_3 \cdot /J_1 \cdot R_3 + /J_3 \cdot R_3 \cdot R_2$ | ↑ RClk |
|  | $+ \ /J_3 \cdot /R_3 \cdot /R_2 + /J_3 \cdot /R_3 \cdot /R_1 + /J_3 \cdot /R_3 \cdot /R_0$ | |
| Inputs: | TClk, $/T_4, /T_3, /T_2, /T_1, /T_0$, TxSym$_3$, TxSym$_2$, TxSym$_1$, Tx Sym$_0$ | |
| Outputs: | TxClk, $/T_4$out, $/T_3$out, $/T_2$out, $/T_1$out, $/T_0$out, $I_3A, I_1$ | |
| TxClk | := TClk         -- non-inverted clock for TBC | |
| TClk2 | := TClk2 | |
| dTClk2 | := ////TClk2         -- delayed version of TClk2 | |
| -- three-stage shift register holding slightly-recoded TBC output | | |
| D[1]$_0$ | $:= /Tx_3 \cdot Tx_2 + /Tx_3 \cdot Tx_1 + /Tx_2 \cdot /Tx_1 \cdot Tx_0$ | ↑ TxClk |
| D[1]$_1$ | := $Tx_1$ | ↑ TxClk |
| D[1]$_2$ | := $Tx_2$ | ↑ TxClk |
| D[1]$_3$ | := $Tx_3$ | ↑ TxClk |
| D[1]$_4$ | $:= /Tx_3 \cdot Tx_2 + /Tx_3 \cdot Tx_1 + Tx_2 \cdot Tx_1$ | ↑ TxClk |
| D[2]$_0$ | := D[1]$_0$ | ↑ TxClk |
| D[2]$_1$ | := D[1]$_1$ | ↑ TxClk |
| D[2]$_2$ | := D[1]$_2$ | ↑ TxClk |
| D[2]$_3$ | := D[1]$_3$ | ↑ TxClk |
| D[2]$_4$ | := D[1]$_4$ | ↑ TxClk |
| D[3]$_0$ | := D[2]$_0$ | ↑ TxClk |

APPENDIX D2-continued

2 bits/symbol - Logical Equation Form of the Interfaces

| | | |
|---|---|---|
| $D[3]_1$ | := $D[2]_1$ | ↑ TxClk |
| $D[3]_2$ | := $D[2]_2$ | ↑ TxClk |
| $D[3]_3$ | := $D[2]_3$ | ↑ TxClk |
| $D[3]_4$ | := $D[2]_4$ | ↑ TxClk |

-- multiplexer on three-stage shift register output, and its control

| | | |
|---|---|---|
| d | := /reset·/d ·$D[2]_4$·/$D[1]_4$ + /reset·d ·$D[3]_4$ | ↑ TxClk |
| $E_0$ | := /d ·$D[1]_0$ + d ·$D[2]_0$ | |
| $E_1$ | := /d ·$D[1]_1$ + d ·$D[2]_1$ | |
| $E_2$ | := /d ·$D[1]_2$ + d ·$D[2]_2$ | |
| $E_3$ | := /d ·$D[1]_3$ + d ·$D[2]_3$ | |
| $E_4$ | := /d ·$D[1]_4$ + d ·$D[2]_4$ | |
| $E_5$ | := /d ·$D[2]_0$ + d ·$D[3]_0$ | |
| $E_6$ | := /d ·$D[2]_1$ + d ·$D[3]_1$ | |
| $E_7$ | := /d ·$D[2]_2$ + d ·$D[3]_2$ | |
| $E_8$ | := /d ·$D[2]_3$ + d ·$D[3]_3$ | |
| $E_9$ | := /d ·$D[2]_4$ + d ·$D[3]_4$ | |

-- three-stage shift register holding recoded symbol pairs for possible T-bus transmission

| | | |
|---|---|---|
| $F[0]_0$ | := /$E_9$·/$E_8$·$E_5$ + /$E_9$·/$E_8$·$E_4$ + /$E_9$·/$E_8$·$E_3$ + /$E_9$·/$E_8$·$E_0$ <br> + $E_9$·/$E_8$·$E_7$ + /$E_9$·$E_8$·$E_5$ + /$E_9$·$E_8$·$E_0$ + /$E_9$·$E_8$·$E_7$·$E_2$ | ↑ TClk2 |
| $F[0]_1$ | := /$E_9$·/$E_8$·$E_5$ + $E_9$·/$E_8$·$E_7$·$E_6$ + /$E_9$·$E_8$·$E_5$ + /$E_9$·$E_8$·$E_2$ | ↑ TClk2 |
| $F[0]_2$ | := /$E_9$·/$E_8$·$E_5$·$E_4$ + /$E_9$·/$E_8$·$E_5$·$E_4$ + /$E_9$·$E_8$·$E_5$·$E_4$ <br> + /$E_9$·$E_8$·$E_6$ + /$E_9$·$E_8$·$E_7$·$E_2$ + /$E_9$·$E_8$·/$E_7$·/$E_6$·$E_5$·/$E_2$·/$E_1$·$E_0$ | ↑ TClk2 |
| $F[0]_3$ | := $E_9$·/$E_8$ + /$E_9$·$E_8$·$E_7$ + /$E_9$·$E_8$·$E_2$ | ↑ TClk2 |
| $F[0]_4$ | := /$E_8$ + /$E_7$ + /$E_6$ | ↑ TClk2 |
| $F[0]_5$ | := $E_9$ | ↑ TClk2 |
| $F[0]_6$ | := /$E_9$·/$E_8$ + $E_9$·$E_8$ | ↑ TClk2 |
| $F[1]_0$ | := $F[0]_0$ | ↑ TClk2 |
| $F[1]_1$ | := $F[0]_1$ | ↑ TClk2 |
| $F[1]_2$ | := $F[0]_2$ | ↑ TClk2 |
| $F[1]_3$ | := $F[0]_3$ | ↑ TClk2 |
| $F[1]_4$ | := $F[0]_4$ | ↑ TClk2 |
| $F[1]_5$ | := $F[0]_5$ | ↑ TClk2 |
| $F[1]_6$ | := $F[0]_6$ | ↑ TClk2 |
| $F[2]_0$ | := $F[1]_0$ | ↑ TClk2 |
| $F[2]_1$ | := $F[1]_1$ | ↑ TClk2 |
| $F[2]_2$ | := $F[1]_2$ | ↑ TClk2 |
| $F[2]_3$ | := $F[1]_3$ | ↑ TClk2 |
| $F[2]_4$ | := $F[1]_4$ | ↑ TClk2 |
| $F[2]_5$ | := $F[1]_5$ | ↑ TClk2 |
| $F[2]_6$ | := $F[1]_6$ | ↑ TClk2 |

-- control of F[ f ] "digital delay-line" depth via 2-bit synchronous counter f

| | | |
|---|---|---|
| f.clear | := reset + /wd + $F[f]_6$ + $F[f]_5$ + $I_3$ + /$I_1$ | ↑ dTClk2 |
| f.inc | := /reset·$F[f]_6$·$F[f]_5$·/$I_2$·/$I_1$·/$I_0$ <br> + /reset·$F[f]_6$·$F[f]_5$·wd + /reset·$F[f]_6$·$F[f]_5$·/$I_3$·/$I_2$·$I_1$ | ↑ dTClk2 |

-- IFB state

| | | |
|---|---|---|
| $I_0$ | := /reset·/$F[f]_6$·$F[f]_5$ | ↑ dTClk2 |
| $I_1$ | := /reset·$F[f]_6$ | ↑ dTClk2 |
| $I_2$ | := /reset·$F[f]_6$·$F[f]_5$·/$I_3$·$I_1$ | ↑ dTClk2 |
| $I_3$ | := /reset·($F[f]_6$ + $F[f]_5$)·($I_3$ + /wd) | ↑ dTClk2 |
| $I_3A$ | := /reset·$F[f]_6$·($I_3$ + /wd)  -- = = glitch-free $I_1$ · $I_3$ | ↑ dTClk2 |

-- IFB output to T-bus

| | | |
|---|---|---|
| $S_1$ | := /reset·/$I_1$·/$I_0$·/$F[f]_6$·$F[f]_5$ <br> + /reset·$I_3$·$I_0$·/$F[f]_6$·$F[f]_5$ | |
| $S_2$ | := /reset·/$I_1$·/$I_0$·$F[f]_6$ <br> + /reset·/$I_3$·/$I_2$·$I_1$·$F[f]_6$·$F[f]_5$ <br> + /reset·$I_2$·$F[f]_6$·/$F[f]_5$ | |
| $S_3$ | := /reset·/$I_3$·$I_0$·/$F[f]_6$·$F[f]_5$ <br> + /reset·/$I_3$·/$I_2$·$I_1$·$F[f]_6$·/$F[f]_5$ <br> + /reset·$I_2$·$F[f]_6$·$F[f]_5$ | |
| $T_0$out | := wd· ( $s_2$ + $s_3$·$F[f]_0$ ) | ↑ dTClk2 |
| $T_1$out | := wd· ( $s_2$ + $s_3$·$F[f]_1$ ) | ↑ dTClk2 |
| $T_2$out | := wd· ( $s_1$ + $s_2$ + $s_3$·$F[f]_2$ ) | ↑ dTClk2 |
| $T_3$out | := wd· ( $s_2$ + $s_3$·$F[f]_3$ ) | ↑ dTClk2 |
| $T_4$out | := wd· ( $s_1$ + $s_2$ + $s_3$·$F[f]_4$ ) | ↑ dTClk2 |

-- IFB assessment of whether its asserted T-bus symbol was dominant

| | | |
|---|---|---|
| wd | := ($T_0$·$T_0$out + /$T_0$·/$T_0$out) <br> · ($T_1$·$T_1$out + /$T_1$·/$T_1$out) <br> · ($T_2$·$T_2$out + /$T_2$·/$T_2$out) <br> · ($T_3$·$T_3$out + /$T_3$·/$T_3$out) <br> · ($T_4$·$T_4$out + /$T_4$·/$T_4$out) | ↑ TClk2 |

I claim:

1. In a combination system, having a modem for providing an interface to a communication link, said communication system further having a plurality of controllers whereby each of said controllers is connected to said modem via an interface apparatus, and further wherein said modem and said controllers comply with a predetermined protocol, said interface apparatus comprising:

a) bus means, for providing a medium to transfer signals between said controllers and said modem;

b) first interface means, having a decoder, connected to said bus means, for interfacing said modem to said bus means, said first interface means implementing a modem-associated multi-state state machine which responds to signals on said bus to maintain the predetermined protocol between said modem and said first interface means, the predetermined protocol being maintained by decoding signals from said bus means based on a current state of the multi-state state machine; and c) a plurality of second interface means, each having an encoder, each of said second interface means being connected to said bus means and to a corresponding controllers, for interfacing each of said plurality of controllers to said bus means, each of said second interface means implementing a controller-associated multi-state state machine which responds to signals on said bus means and further responds to signals from the corresponding controller, each of said second interface means maintaining the predetermined protocol between the second interface means and the corresponding controller, and wherein each of said second interface means transmits onto said bus means in a predetermined cycle to resolve conflicts between controllers for access to said bus means.

2. An interface apparatus according to claim 1, wherein said predetermined cycle comprises an assert-/compare cycle.

3. An interface apparatus according to claim 2, wherein said assert portion of said predetermined cycle comprises one bit.

4. An interface apparatus according to claim 3, wherein said first interface means implements a modem-associated multi-state state machine having four states, identified as A-idle, A-line, A-par-mgmt, and A-ser-mgmt.

5. An interface apparatus according to claim 4, wherein each of said second interface means implements a controller-associated multi-state state machine having six states, identified as B-idle, B-line, B-line-overrun, B-par-mgmt, B-ser-mgmt, and B-mgmt-over-run.

6. An interface apparatus according to claim 5, wherein said predetermined protocol is a standard as defined by the IEEE standard 802.4-(1989).

7. An interface apparatus according to claim 6, wherein said second interface means recodes the signals having the predetermined protocol from the corresponding controller into dominance sets.

8. An interface apparatus according to claim 2, wherein said second interface means recodes the signals having the predetermined protocol from the corresponding controller into dominance sets.

9. An interface apparatus according to claim 2, wherein said assert portion of said predetermined cycle comprises two bits.

10. An interface apparatus according to claim 9, wherein said first interface means implements a modem-associated multi-state state machine having three states, identified as A-idle, A-line, and A-urgent.

11. An interface apparatus according to claim 10, wherein each of said second interface means implements a controller-associated multi-state state machine having six states, identified as B-idle, B-line, B-line-overrun, B-par-mgmt, B-ser-mtmt, and B-mgmt-over-run.

12. An interface apparatus according to claim 11, wherein said predetermined protocol is a standard as defined by the IEEE Std 802.4 -(1989).

13. An interface apparatus according to claim 12, wherein said second interface means recodes the signals having the predetermined protocol from the corresponding controller into dominance sets.

14. An interface apparatus according to claim 2, wherein said assert portion of said predetermined cycle comprises a plurality of bits.

15. An interface apparatus according to claim 14, wherein said predetermined protocol is a standard as defined by the IEEE standard 802.4 -(1989).

16. In a communication system, having a normal configuration that includes a modem for providing an interface to a communication link and having a backup configuration that eliminates the modem, said communication system further having a plurality of controllers whereby in the normal configuration each of said controllers is connected to said modem via an interface apparatus, and further wherein said modem and said controllers comply with a predetermined protocol, said interface apparatus of the backup configuration comprising:

a) bus means, for providing a medium to transfer signals between said controllers in accordance with the predetermined protocol;

b) first interface means, having a decoder, connected to said bus means, for simulating a modem, whereby said simulation functions in a local loopback mode; and c) a plurality of second interface means, each having an encoder, each of said second interface means being connected to said bus means and to a corresponding controller, for interfacing each of said plurality of controllers to said bus means, each of said second interface means implementing a controller-associated multi-state state machine which responds to signals on said bus means and further responds to signals from the corresponding controller, and wherein each of said second interface means transmits onto said bus means in a predetermined cycle to resolve conflicts between controllers for access to said bus means, each of said second interface means maintaining the predetermined protocol between the second interface means and the corresponding controller, thereby permitting the controllers connected to said bus means to communicate with each other in accordance with the predetermined protocol.

17. In a communication system, having a first plurality of modems for providing an interface to a communication link, said communication system further having a second plurality of controllers whereby each of said controllers is connected to said plurality of modems via an interface apparatus, and further wherein each of said modems and each of said controllers comply with a predetermined protocol, said interface apparatus comprising:

a) bus means, for providing a medium to transfer signals between each of said controllers and each of said modems;

b) a plurality of first interface means, each having a decoder, each of said first interface means connected to a corresponding modem and, connected to said bus means, for interfacing each of said modems to said bus means, each of said first interface means implementing a modem-associated multi-state state machines to signals on said bus to maintain the predetermined protocol between the corresponding modem and the first interface means;

c) a plurality of second interface means, each having an encoder, each of said second interface means being connected to said bus means and to a corresponding controller, for interfacing each of said plurality of controllers to said bus means, each of said second interface means implementing a controller-associated multi-state state machine which responds to signals on said bus means and further responds to signals from the corresponding controller and wherein each of said second interface means transmits onto said bus means in a predetermined cycle to resolve conflicts between controllers for access to said bus means, each of said second interface means maintaining the predetermined protocol between the second interface means and the corresponding controller; and d) connecting means, connected to each modem and to each of said second interface means, for providing a common clocking signal to each modem and each of said second interface means.

18. An interface apparatus according to claim 17, wherein said predetermined cycle comprises an assert-/compare cycle.

19. An interface apparatus according to claim 18 wherein said assert portion of said predetermined cycle comprises one bit.

20. An interface apparatus according to claim 19, wherein said first interface means implements a modem-associated multi-state state machine having four states, identified as A-idle, A-line, A-par-mgmt, and A-ser-mgmt.

21. An interface apparatus according to claim 20, wherein each of said second interface means implements a controller-associated multi-state state machine having six states, identified as B-idle, B-line, B-line overrun, B-par-mgmt, B-ser-mgmt, and B-mgmt overrun.

22. An interface apparatus according to claim 21, wherein said predetermined protocol is a standard as defined by the IEEE standard 802.4 -(1989).

23. An interface apparatus according to claim 22, wherein said second interface means recodes the signals having the predetermined protocol from the corresponding controller into dominance sets.

24. An interface apparatus according to claim 18, wherein said second interface means recodes the signals having the predetermined protocol from the corresponding controller into dominance sets.

25. An interface apparatus according to claim 18 wherein said assert portion of said predetermined cycle comprises two bits.

26. An interface apparatus according to claim 25, wherein said first interface means implements a modem-associated multi-state machine having three states, identified as A-idle, A-line, and A-mgmt.

27. An interface apparatus according to claim 26, wherein each of said second interface means implements a controller-associated multi-state state machine having six states, identified as B-idle, B-line, B-line-overrun, B-par-mgmt, B-ser-mgmt, and B-mgmt-overrun.

28. An interface apparatus according to claim 27, wherein said predetermined protocol is a standard as defined by the IEEE standard 802.4-(1989).

29. An interface apparatus according to claim 28, wherein said second interface means recodes the signals having the predetermined protocol from the corresponding controller into dominance sets.

* * * * *